US011805522B2

(12) United States Patent
Liu et al.

(10) Patent No.: US 11,805,522 B2
(45) Date of Patent: Oct. 31, 2023

(54) SIDELINK FEEDBACK TECHNIQUES IN SIDELINK WIRELESS COMMUNICATIONS

(71) Applicant: QUALCOMM Incorporated, San Diego, CA (US)

(72) Inventors: Chih-Hao Liu, San Diego, CA (US); Yisheng Xue, San Diego, CA (US); Lik Hang Silas Fong, Bridgewater, NJ (US); Jing Sun, San Diego, CA (US); Xiaoxia Zhang, San Diego, CA (US); Xiaojie Wang, Hillsborough, NJ (US); Jung Ho Ryu, Fort Lee, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 17/408,302

(22) Filed: Aug. 20, 2021

(65) Prior Publication Data

US 2023/0057841 A1    Feb. 23, 2023

(51) Int. Cl.
*H04W 4/00* (2018.01)
*H04W 72/20* (2023.01)
*H04W 72/0446* (2023.01)

(52) U.S. Cl.
CPC ....... *H04W 72/20* (2023.01); *H04W 72/0446* (2013.01)

(58) Field of Classification Search
CPC ............. H04W 72/20; H04W 72/0446; H04W 72/0053
See application file for complete search history.

(56) References Cited

U.S. PATENT DOCUMENTS

| 2020/0280398 | A1* | 9/2020 | Hwang | H04L 1/1819 |
|---|---|---|---|---|
| 2021/0092783 | A1* | 3/2021 | Sun | H04W 74/085 |
| 2021/0126744 | A1 | 4/2021 | Hwang et al. | |
| 2022/0110060 | A1* | 4/2022 | Yang | H04W 76/14 |
| 2022/0338168 | A1* | 10/2022 | Wang | H04W 28/26 |
| 2022/0377831 | A1* | 11/2022 | Li | H04W 76/14 |
| 2022/0386328 | A1* | 12/2022 | Liu | H04W 72/40 |

(Continued)

OTHER PUBLICATIONS

International Search Report and Written Opinion—PCT/US2022/040729—ISA/EPO—dated Nov. 18, 2022.

(Continued)

*Primary Examiner* — Abdelnabi O Musa
(74) *Attorney, Agent, or Firm* — Holland & Hart LLP

(57) ABSTRACT

Methods, systems, and devices for wireless communications are described in which a first user equipment (UE) may transmit sidelink communications to a second UE, and the second UE may provide feedback associated with the sidelink communication to the first UE in a sidelink control information (SCI) transmission. In some cases, the SCI is first stage SCI transmitted in a sidelink control channel or second stage SCI transmitted in a sidelink shared channel. The feedback may include one or more of acknowledgment/negative-acknowledgment feedback, channel state information feedback, a scheduling request, or any combinations thereof. In some cases, the first UE may indicate resources of the second slot to the second UE for transmission of the feedback in the SCI, such as by providing a time offset value and resource index that identifies the resources.

30 Claims, 19 Drawing Sheets

(56) References Cited

U.S. PATENT DOCUMENTS

| | | | |
|---|---|---|---|
| 2023/0028810 A1* | 1/2023 | Ibrahim | H04W 72/0446 |
| 2023/0049106 A1* | 2/2023 | Zhao | H04W 72/20 |
| 2023/0117182 A1* | 4/2023 | Xue | H04L 5/0048 |
| | | | 370/329 |
| 2023/0125753 A1* | 4/2023 | Liu | H04L 47/283 |
| | | | 370/235 |
| 2023/0156664 A1* | 5/2023 | Wang | H04W 72/51 |
| | | | 370/329 |

OTHER PUBLICATIONS

LG Electronics: "Discussion on Physical Layer Structure for NR Sidelink", 3GPP TSG RAN WG1 #99, R1-1912586, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019, XP051823493, 34 Pages, Section 2.1.1, 2.1.3, 2.1. 2.1.

* cited by examiner

SIDELINK FEEDBACK TECHNIQUES IN SIDELINK WIRELESS COMMUNICATIONS

FIELD OF TECHNOLOGY

The following relates to wireless communications, including sidelink feedback techniques in sidelink wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may configure UEs for sidelink transmission. The base station may configure time and frequency resources for the UEs to perform the sidelink transmission. In some cases, UEs that receive sidelink communications may provide feedback to a transmitting UE, which may indicate whether the receiving UE successfully decoded a transmission, may include channel state information (CSI) feedback, and the like. Efficient techniques for transmitting such feedback may help to enhance overall network efficiency and reliability.

SUMMARY

The described techniques relate to improved methods, systems, devices, and apparatuses that support sidelink feedback techniques in sidelink wireless communications. In various aspects, the described techniques provide for a first user equipment (UE) to transmit sidelink communications to a second UE, and the second UE to provide feedback to the first UE in a sidelink control information (SCI) transmission. The first UE may transmit the sidelink communications in a first slot having a first slot duration that is selected from at least two available slot durations for sidelink communications, and the feedback may be provided by the second UE in a second slot that has the first slot duration. In some cases, the SCI is first stage SCI (SCI-1) transmitted in a sidelink control channel or second stage SCI (SCI-2) transmitted in a sidelink shared channel. The feedback may include one or more of acknowledgment/negative-acknowledgment (ACK/NACK) feedback associated with the first sidelink communication, channel state information (CSI) feedback, a scheduling request (SR), or any combinations thereof. In some cases, the first UE may indicate resources of the second slot to the second UE for transmission of the feedback in the SCI, such as by providing a time offset value and resource index that identifies the resources.

A method for wireless communication at a first user equipment (UE) is described. The method may include transmitting, to a second UE, a first sidelink communication in a first slot of a set of sidelink resources, the first slot having a first slot duration of at least two available slot durations for sidelink communications and receiving, from the second UE responsive to the first sidelink communication, sidelink control information in a second slot of the set of sidelink resources, the second slot having the first slot duration, and where the sidelink control information includes one or more types of sidelink feedback information.

An apparatus for wireless communication at a first UE is described. The apparatus may include a processor, memory coupled with the processor, and instructions stored in the memory. The instructions may be executable by the processor to cause the apparatus to transmit, to a second UE, a first sidelink communication in a first slot of a set of sidelink resources, the first slot having a first slot duration of at least two available slot durations for sidelink communications and receive, from the second UE responsive to the first sidelink communication, sidelink control information in a second slot of the set of sidelink resources, the second slot having the first slot duration, and where the sidelink control information includes one or more types of sidelink feedback information.

Another apparatus for wireless communication at a first UE is described. The apparatus may include means for transmitting, to a second UE, a first sidelink communication in a first slot of a set of sidelink resources, the first slot having a first slot duration of at least two available slot durations for sidelink communications and means for receiving, from the second UE responsive to the first sidelink communication, sidelink control information in a second slot of the set of sidelink resources, the second slot having the first slot duration, and where the sidelink control information includes one or more types of sidelink feedback information.

A non-transitory computer-readable medium storing code for wireless communication at a first UE is described. The code may include instructions executable by a processor to transmit, to a second UE, a first sidelink communication in a first slot of a set of sidelink resources, the first slot having a first slot duration of at least two available slot durations for sidelink communications and receive, from the second UE responsive to the first sidelink communication, sidelink control information in a second slot of the set of sidelink resources, the second slot having the first slot duration, and where the sidelink control information includes one or more types of sidelink feedback information.

In some examples of the method, apparatuses, and non-transitory computer-readable medium described herein, the sidelink control information may be first stage sidelink control information (SCI-1) or second stage sidelink control information (SCI-2), and the one or more types of sidelink feedback information include acknowledgment/negative-acknowledgment feedback associated with the first sidelink communication, channel state information (CSI) feedback, a scheduling request (SR), or any combinations thereof. In some examples of the method, apparatuses, and non-transitory computer-readable medium described herein, the sidelink control information may be received in a shared channel transmission from the second UE that does not include an associated data transmission, and the sidelink control information includes the one or more types of sidelink feedback information and a source/destination identification that indicates one or more of the first UE or the second UE. Some examples of the method, apparatuses, and non-transitory computer-readable medium described herein may further include operations, features, means, or instructions for determining that the sidelink control information in the second slot is associated with the second UE based on the source/destination identification, and where one or more other UEs having different source/destination identifications may be allocated with overlapping resources of the set of sidelink resources. In some examples of the method, apparatuses, and non-transitory computer-readable medium described herein, the sidelink control information may be rate-matched to all resource elements (REs) of the shared channel transmission.

In some examples of the method, apparatuses, and non-transitory computer-readable medium described herein, the sidelink control information may be received in a shared channel transmission from the second UE that also includes an associated data transmission, and the sidelink control information further includes scheduling information that indicates resources for the first UE to transmit feedback information to the second UE associated with the data transmission. In some examples of the method, apparatuses, and non-transitory computer-readable medium described herein, the scheduling information includes a slot offset value that indicates a number of slots between the shared channel transmission and the sidelink control information transmission, and a resource index that indicates a transmission resource for the sidelink control information transmission.

Some examples of the method, apparatuses, and non-transitory computer-readable medium described herein may further include operations, features, means, or instructions for determining that the sidelink control information is included in a second stage sidelink control information transmission in the second slot based on a format field in a first stage sidelink control information transmission in the second slot. Some examples of the method, apparatuses, and non-transitory computer-readable medium described herein may further include operations, features, means, or instructions for determining that the sidelink control information is included in a second stage sidelink control information transmission in the second slot based on a reference signal pattern that is indicated for the second slot.

In some examples of the method, apparatuses, and non-transitory computer-readable medium described herein, the sidelink control information is received in a sidelink control channel transmission from the second UE that does not include scheduling information for an associated data transmission, and where the sidelink control channel transmission is transmitted in one or more resource blocks that span all symbols of the second slot. In some examples of the method, apparatuses, and non-transitory computer-readable medium described herein, a symbol duration for the sidelink control channel transmission may be a same symbol duration or a different symbol duration than control channel transmissions that include scheduling information for data transmissions. In some examples of the method, apparatuses, and non-transitory computer-readable medium described herein, the sidelink control channel transmission has a same payload size as a control channel transmission that includes scheduling information for a data transmission. Some examples of the method, apparatuses, and non-transitory computer-readable medium described herein may further include operations, features, means, or instructions for determining that the sidelink feedback information is included in a first stage sidelink control information transmission in the second slot based on a cyclic redundancy check (CRC) of the sidelink control information being scrambled with an identifier associated with the sidelink feedback information.

In some examples of the method, apparatuses, and non-transitory computer-readable medium described herein, the sidelink control information includes the one or more types of sidelink feedback information and an identification of the first UE. In some examples of the method, apparatuses, and non-transitory computer-readable medium described herein, the identifier used for scrambling the CRC is a unique identifier associated with the first UE.

In some examples of the method, apparatuses, and non-transitory computer-readable medium described herein, the sidelink control information is transmitted within the second slot in resources that are mapped to a first configured subchannel of a set of multiple configured subchannels within the set of sidelink resources, and where each of the plurality configured subchannels has an associated resource index. In some examples of the method, apparatuses, and non-transitory computer-readable medium described herein, the first sidelink communication indicates an offset between the first slot and the second slot, and a first index value that indicates the first configured subchannel. In some examples of the method, apparatuses, and non-transitory computer-readable medium described herein, the offset between the first slot and the second slot is a non-numerical offset that indicates sidelink feedback information for two or more slots is to be transmitted to the first UE in a same sidelink control information transmission.

In some examples of the method, apparatuses, and non-transitory computer-readable medium described herein, the one or more types of sidelink feedback information includes CSI feedback, and where the first sidelink communication indicates resources for transmission of the CSI feedback and includes a trigger to initiate CSI measurement at the second UE. In some examples of the method, apparatuses, and non-transitory computer-readable medium described herein, the set of sidelink resources include a set of multiple sidelink resources that are allocated according to a second slot duration of the at least two available slot durations for sidelink communications, where the first slot duration is shorter than the second slot duration. In some examples of the method, apparatuses, and non-transitory computer-readable medium described herein, a subset of the set of sidelink resources may be configured for sidelink control information transmissions according to the first slot duration. In some examples of the method, apparatuses, and non-transitory computer-readable medium described herein, the first sidelink communication schedules one or more sidelink communications according to the second slot duration, and indicates an offset between the first slot and the second slot and a first index value that indicates resources for the sidelink control information based on the first slot duration. In some examples of the method, apparatuses, and non-transitory computer-readable medium described herein, the one or more types of sidelink feedback information includes CSI feedback, and where the first sidelink communication indicates resources for transmission of the CSI feedback based on the first slot duration and includes a trigger to initiate CSI measurement at the second UE.

A method for wireless communications is described. The method may include receiving, at a second UE from a first UE, a first sidelink communication in a first slot of a set of sidelink resources, the first slot having a first slot duration of at least two available slot durations for sidelink communications, determining feedback information associated with the first sidelink communication, and transmitting, to the first UE, sidelink control information that includes the feedback information, the sidelink control information transmitted in a second slot of the set of sidelink resources that has the first slot duration.

An apparatus for wireless communications is described. The apparatus may include a processor, memory coupled with the processor, and instructions stored in the memory. The instructions may be executable by the processor to cause the apparatus to receive, at a second UE from a first UE, a first sidelink communication in a first slot of a set of sidelink resources, the first slot having a first slot duration of at least two available slot durations for sidelink communications, determine feedback information associated with the first sidelink communication, and transmit, to the first UE, sidelink control information that includes the feedback information, the sidelink control information transmitted in a second slot of the set of sidelink resources that has the first slot duration.

Another apparatus for wireless communications is described. The apparatus may include means for receiving, at a second UE from a first UE, a first sidelink communication in a first slot of a set of sidelink resources, the first slot having a first slot duration of at least two available slot durations for sidelink communications, means for determining feedback information associated with the first sidelink communication, and means for transmitting, to the first UE, sidelink control information that includes the feedback information, the sidelink control information transmitted in a second slot of the set of sidelink resources that has the first slot duration.

A non-transitory computer-readable medium storing code for wireless communications is described. The code may include instructions executable by a processor to receive, at a second UE from a first UE, a first sidelink communication in a first slot of a set of sidelink resources, the first slot having a first slot duration of at least two available slot durations for sidelink communications, determine feedback information associated with the first sidelink communication, and transmit, to the first UE, sidelink control information that includes the feedback information, the sidelink control information transmitted in a second slot of the set of sidelink resources that has the first slot duration.

In some examples of the method, apparatuses, and non-transitory computer-readable medium described herein, the sidelink control information may be SCI-1 or SCI-2, and the sidelink feedback information includes one or more of acknowledgment/negative-acknowledgment feedback associated with the first sidelink communication, CSI feedback, a SR, or any combinations thereof. In some examples of the method, apparatuses, and non-transitory computer-readable medium described herein, the sidelink control information may be transmitted in a shared channel transmission from the second UE that does not include an associated data transmission, and the sidelink control information includes the sidelink feedback information and a source/destination identification that indicates one or more of the first UE or the second UE. In some examples of the method, apparatuses, and non-transitory computer-readable medium described herein, the sidelink control information may be transmitted in a shared channel transmission that also includes an associated data transmission, and the sidelink control information further includes scheduling information that indicates resources for the first UE to transmit feedback information to the second UE associated with the data transmission.

DETAILED DESCRIPTION

Figure 1:
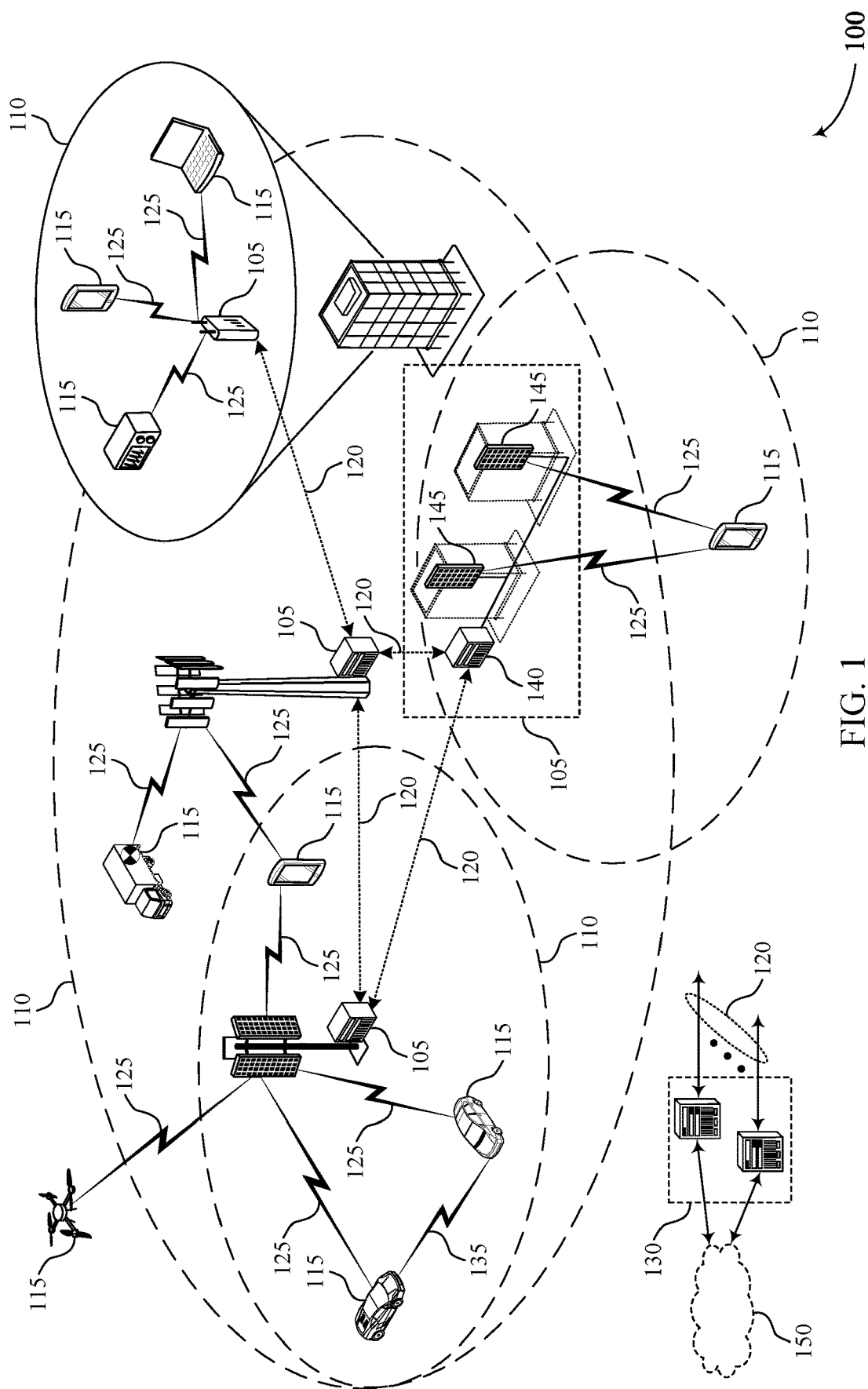
FIG. 1 illustrates an example of a wireless communications system that supports sidelink feedback techniques in sidelink wireless communications in accordance with aspects of the present disclosure.

A wireless communications system may support access links and sidelinks for communications between communication devices. An access link may refer to a communication link between a user equipment (UE) and a base station, and a sidelink may refer to a communication link between similar wireless devices (e.g., a communication link between UEs, or a communication link between base stations). In some cases, sidelink communications may support multiple modes of resource allocation. In a first mode of resource allocation (e.g., Mode 1), a base station may schedule resources for sidelink communications between multiple UEs. In a second mode of resource allocation (e.g., Mode 2), a UE may autonomously schedule resources for sidelink communications, and a base station may not schedule resources for the sidelink communications.

In some cases, sidelink communications may be configured with resource pools (RPs) in which sidelink resources may be assigned at a slot level, or at a mini-slot level (e.g., a subset of symbols within a sidelink slot). Such RP configurations may provide for enhanced flexibility in scheduling sidelink communications. However, slot-based and mini-slot based RPs may provide resources for feedback information, such as hybrid automatic repeat request (HARQ) acknowledgment/negative-acknowledgment (ACK/NACK) feedback, in a physical sidelink feedback channel (PSFCH) that is configured at a slot level. Such slot level configuration for feedback resources may result in relatively long latency for ACK/NACK feedback. Further, the PSFCH allows for one ACK/NACK bit for an associated feedback for a particular sidelink transmission associated with a HARQ process. In some cases, such as in unlicensed band operation, PSFCH resources may not clear a channel contention procedure, and a UE may not be able to report ACK/NACK using indicated resources. Further, sidelink configurations may provide that channel state information (CSI) reports are transmitted in a layer two (L2) communications such as a medium access control (MAC) control element (CE), which may results in relatively high latency in CSI feedback. Various aspects as discussed herein provide techniques for conveying feedback (e.g., HARQ ACK/NACK feedback, channel state information (CSI) feedback, scheduling request (SR) information, or combinations thereof) with lower latency, and with multiple ACK/NACK bits in a feedback transmission.

In some cases, a sidelink control information (SCI) format is provided for first stage SCI (SCI-1) transmitted on a physical sidelink control channel (PSCCH) or second stage SCI (SCI-2) transmitted on a physical sidelink shared channel (PSSCH). The SCI format may provide sidelink feedback information (SLFI), which may include feedback information such as HARQ ACK/NACK feedback for one or multiple HARQ processes at a mini-slot level, and thus provide lower latency feedback than PSFCH feedback. The SLFI may also provide for CSI feedback on a L1 channel, which can provide lower latency for CSI. The SLFI may include ACK/NACK bit(s), CSI information, SR information, or any combinations thereof.

In some cases, SLFI may include a source/destination ID which may allow for different UEs to be allocated overlapping mini-slot resources for SLFI. In cases where SCI-2 is used for SLFI, the SCI-2 resources may include only SLFI or SLFI plus other SCI-2 scheduling information. The SCI-2 with SLFI may be indicated using a SCI-2 format field or by reusing an unused demodulation reference signals (DMRS) pattern index value (e.g., selected from a back-loaded DMRS pattern that is not used in mini-slot sidelink). If SCI-1 is used for SLFI, the SCI-1 format may have a same or different duration and payload size as SCI-1 used to schedule PSSCH. In some cases, the SCI-1 may have its CRC scrambled with a unique RNTI of the transmitting UE, which may allow for different UEs to be allocated overlapping mini-slot resources for SLFI. The resources used for SCI with SLFI may be configured by higher layers, and may be indicated by a timing offset value (e.g., a K1 value) and SLFI resource index.

Particular aspects of the subject matter described in this disclosure may be implemented to realize one or more of the following potential advantages. The techniques employed by the described communication devices may implement flexible feedback resource allocation for sidelink transmission. For example, operations performed by the described communication devices may provide improvements to a feedback resource allocations for sidelink transmission by permitting sidelink feedback information (SLFI) transmission in a layer one communication (e.g., in SCI-1 or SCI-2) using resources that provide reduced latency for sidelink feedback relative to a feedback indication via a PSFCH communication. Such techniques may support reduced latency for sidelink communications, higher data rates, and enhanced reliability, among other benefits.

Aspects of the disclosure are initially described in the context of wireless communications systems. Aspects of the disclosure are further described in the context of slot formats, sidelink feedback resource configurations, and signaling of sidelink feedback resources. Aspects of the disclosure are further illustrated by and described with reference to process flows, apparatus diagrams, system diagrams, and flowcharts that relate to sidelink feedback techniques in sidelink wireless communications.

FIG. 1 illustrates an example of a wireless communications system 100 that supports sidelink feedback techniques in sidelink wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, when two or more UEs 115 communicate using sidelink communications, a UE 115 that receives a sidelink transmission may provide feedback in a SCI transmission. In some cases, the SCI is a SCI-1 transmitted in a sidelink control channel (e.g., PSCCH) or a SCI-2 transmitted in a sidelink shared channel (e.g., PSSCH). The feedback may include one or more of ACK/NACK feedback, CSI feedback, a SR, or any combinations thereof. In some cases, the transmitting UE 115 may indicate resources for the sidelink feedback information (SLFI), such as by providing a time offset value relative to a sidelink transmission, and resource index that identifies the resources.

Figure 2:
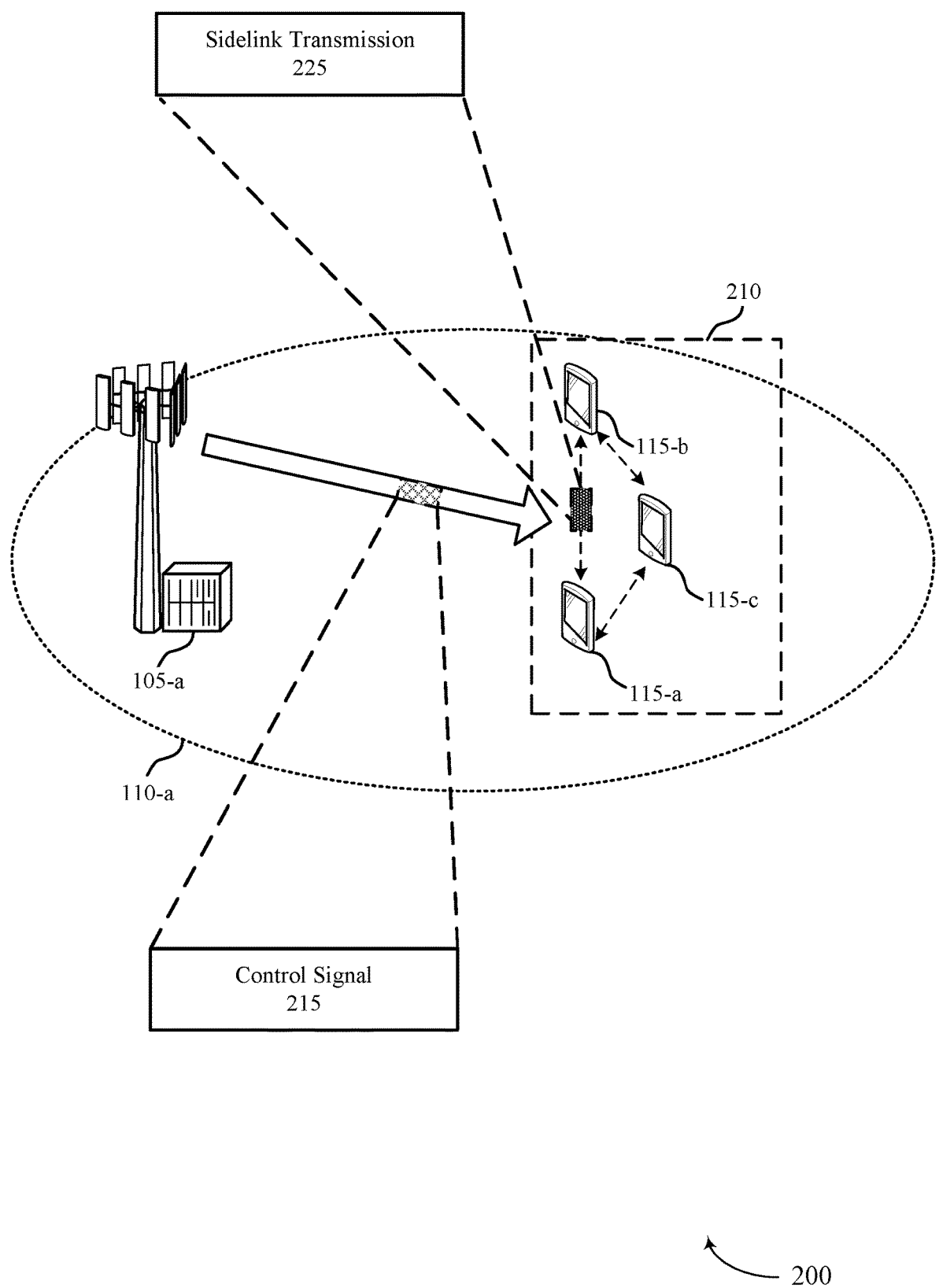
FIG. 2 illustrates an example of a portion of a wireless communications system that supports sidelink feedback techniques in sidelink wireless communications in accordance with aspects of the present disclosure.

FIG. 2 illustrates an example of a wireless communications system 200 that supports sidelink feedback techniques in sidelink wireless communications in accordance with aspects of the present disclosure. In some examples, the wireless communications system 200 may implement aspects of wireless communications system 100. The wireless communications system 200 includes a base station 105-*a*, a geographic coverage area 110-*a*, and one or more UEs 115 (which may also be referred to as devices).

In some cases, the wireless communications system 200 may utilize control signaling 215 to schedule resources for the UEs 115 to perform uplink transmissions, sidelink communications, or any combinations thereof. In some examples, the group of UEs 210 (for example, a first UE 115-*a*, a second UE 115-*b*, and a third UE 115-*c*) may communicate with each other (for example, within a V2X system, a D2D system, among other examples) and may employ sidelink transmissions 225 to save power, reduce latency, and ensure reliable communications. In some cases, vehicles may communicate using V2X resource allocation mode 2 (that utilizes UE autonomous resource selection).

The wireless communications system 200 may support both access links and sidelinks for communications between one or more communication devices. An access link may refer to a communication link between UEs 115 (e.g., first UE 115-*a*, second UE 115-*b*, and third UE 115-*c*) and base station 105-*a*. A sidelink may refer to any communication link between similar wireless devices (for example, a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, integrated access and backhaul (IAB) signaling, or other signals transmitted over-the-air from one device to one or more other like devices.

In some cases, sidelink communications may be configured with RPs in which sidelink resources may be assigned at a slot level, or at a mini-slot level (e.g., a subset of symbols within a sidelink slot). Such RP configurations may provide for enhanced flexibility in scheduling sidelink communications. Further, in accordance with various aspects as discussed herein, a SCI format is provided for SLFI transmissions, such as an SCI-1 transmitted on a PSCCH or an SCI-2 transmitted on a PSSCH. The SLFI may include feedback information such as HARQ ACK/NACK feedback for one or multiple HARQ processes at a slot or mini-slot level, and thus provide lower latency feedback than PSFCH feedback. The SLFI may also provide for CSI feedback on a L1 channel, which can provide lower latency for CSI. Further, the SLFI may include one or multiple ACK/NACK bits that may allow for reporting of feedback for multiple HARQ processes in a single SLFI transmission (e.g., that are reported in a type-3 HARQ codebook), CSI information (e.g., that allows for CSI feedback using a L1 channel rather than a MAC-CE, thus providing faster CSI feedback), SR information, or any combinations thereof.

In some cases, SLFI may include a source/destination ID which may allow for different UEs 115 to be allocated overlapping slot or mini-slot resources for SLFI. In cases where SCI-2 is used for SLFI, the SCI-2 resources may include only SLFI or SLFI plus other SCI-2 scheduling information. The SCI-2 with SLFI may be indicated using a SCI-2 format field or by reusing an unused DMRS pattern index value (e.g., selected from a back-loaded DMRS pattern that is not used in mini-slot sidelink). If SCI-1 is used for SLFI, the SCI-1 format may have a same or different duration and payload size as SCI-1 used to schedule PSSCH. In some cases, the SCI-1 may have its CRC scrambled with a unique RNTI of the transmitting UE, which may allow for different UEs 115 to be allocated overlapping mini-slot resources for SLFI. The resources used for SCI with SLFI may be configured by higher layers, and may be indicated by a timing offset value (e.g., a K1 value) and SLFI resource index. In some cases, a transmitting UE 115 (e.g., first UE 115-*a*) may assign orthogonal SLFI resources for one or more receiving UEs 115 (e.g., second UE 115-*b*, third UE 115-*c*, or both).

Figure 3:
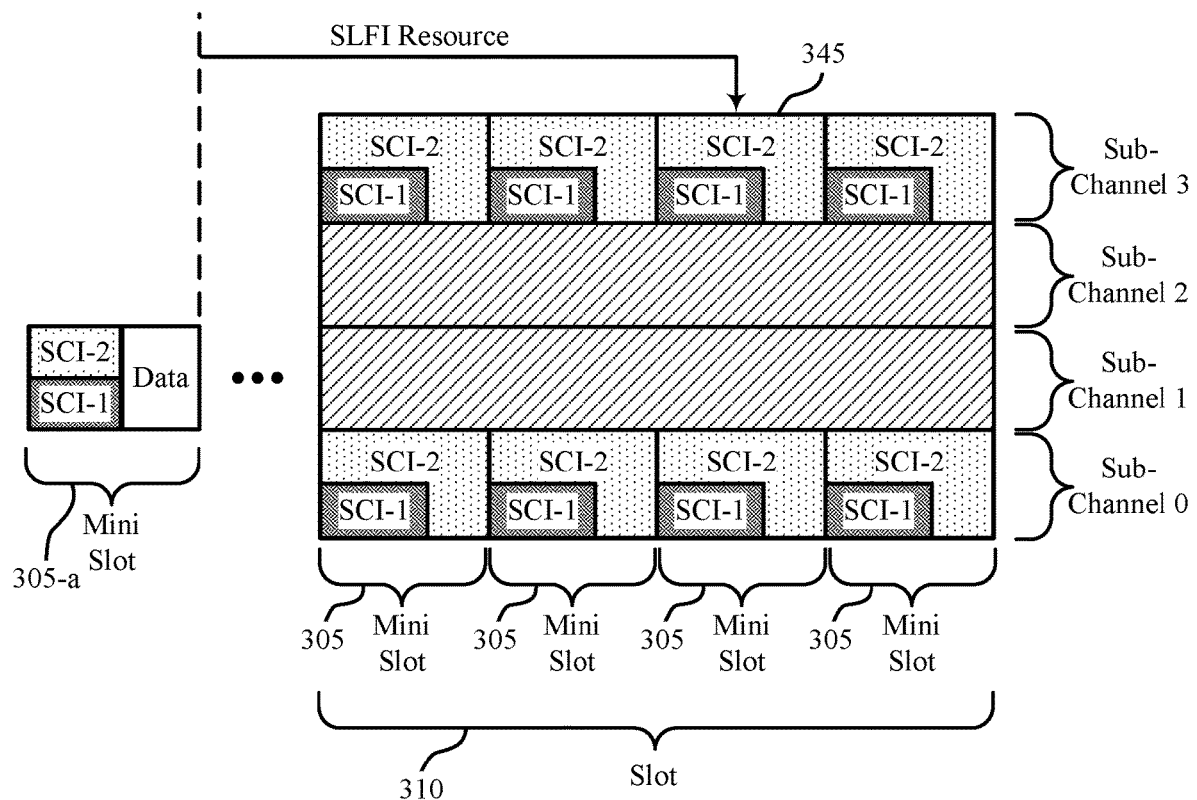
FIG. 3 illustrates an example of sidelink feedback information resources that support sidelink feedback techniques in sidelink wireless communications in accordance with aspects of the present disclosure.

FIG. 3 illustrates an example of sidelink feedback information resources 300 that support sidelink feedback techniques in sidelink wireless communications in accordance with aspects of the present disclosure. In some examples, the sidelink feedback information resources 300 may support communications in aspects of wireless communications systems 100 or 200. As discussed herein, in some cases a sidelink RP may have a mini-slot 305 configuration, in which a sidelink transmission may start at one or more locations within a slot 310. Such a sidelink RP may allow dynamic scheduling using mini-slots 305, wherein the mini-slot 305 pattern may be dynamically controlled, and a PSCCH may indicate the pattern and enable/disable mini-slot operation to save on a receiver's power.

In some cases, each mini-slot 305 may contain independent mini-slot SCI-1 320, SCI-2 325, and data 315 resources within slot resources 330 of a sidelink slot 310. Further, each mini-slot 305 may include an automatic gain control (AGC) symbol and gap (e.g., for switching). In some cases, a common legacy SCI-1 in a first mini-slot may be provided for legacy channel sensing, slot-based reservation and dynamic indication of enabling mini-slot in the mixture of a sPSSCH and PSSCH resource pool.

In the example of FIG. 3, a first mini-slot 305-*a* may include data 315, SCI-1 320, and SCI-2 325 resources. In this example, the mini-slot RP may include slot resources 330 of slot 310 that has a number of sub-channels (e.g., sub-channel 0 through sub-channel 3), in which two of the sub-channels (e.g., sub-channel 0 and sub-channel 3 as shown in this example) include SLFI resources. In some cases, a mini-slot SCI-2 325 format may be defined for carrying SLFI, and/or a mini-slot SCI-1 320 format may be defined for carrying SLFI. In some cases, the SLFI resource configuration may be provided a mini-slot or slot-based RP, and SLFI resource mapping may be provided in sub-channels, mini-slots 305, or both. For example, the first mini-slot 305-*a* may include an indication of a first SLFI resource 345, such as by indicating an offset (e.g., a K1 value) between the first mini-slot 305-*a* and first SLFI resource 345 (or indicating a slot offset between the first mini-slot 305-*a* slot and slot 310. The indication of the first SLFI resource 345 may also include a SLFI index that identifies a location of the SLFI resource 345 (e.g., mini-slot ID, sub-channel ID, etc.). By providing a number of different available SLFI resources, a transmitting device may assign orthogonal SLFI resources for multiple receiving devices.

Figure 4:
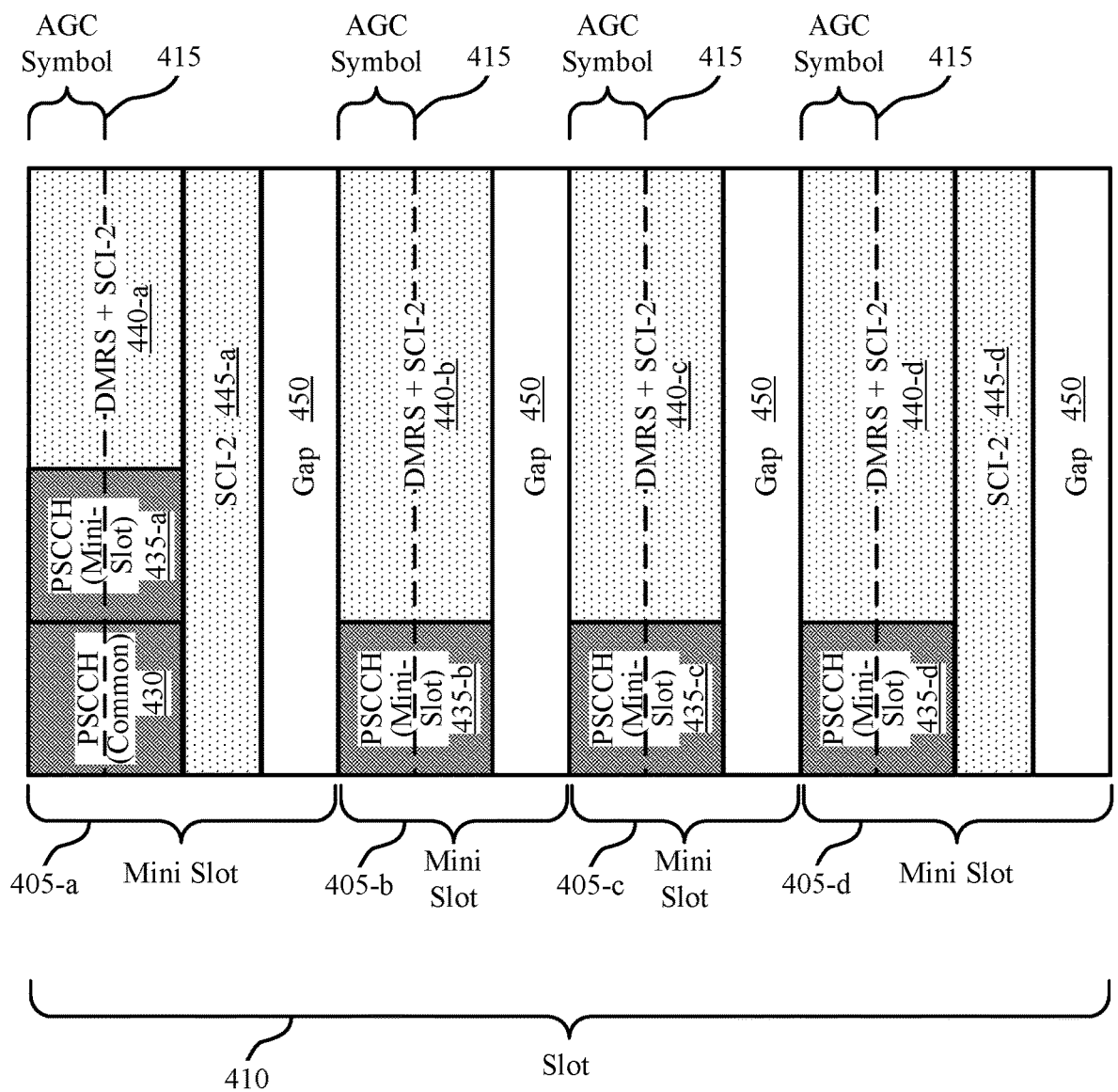
FIG. 4 illustrates an example of slot and mini-slot resources that support sidelink feedback techniques in sidelink wireless communications in accordance with aspects of the present disclosure.

FIG. 4 illustrates an example of slot and mini-slot resources 400 that support sidelink feedback techniques in sidelink wireless communications in accordance with aspects of the present disclosure. In some examples, the slot and mini-slot resources 400 may support communications in aspects of wireless communications systems 100 or 200. In this example, a number of mini-slots 405 may configured in a RP, where a slot 410 may include multiple mini-slots 405. In this example, each mini-slot 405 may include an AGC symbol 415 and a gap symbol 450. In this example, the mini-slots 405 may include SLFI in SCI-2 425 transmissions. Mini-slots 405 may include SCI-1 420 resources and SCI-2 resources 425.

In the example of FIG. 4, a first mini-slot 405-a may include four symbols, the first two of which may include PSCCH resources for a common PSCCH 430 and a first mini-slot PSCCH 435-a, and PSSCH resources that include a DMRS and a portion of a first SCI-2 440-a that may include SLFI. A second symbol of the first mini-slot 405-a may include a remaining portion of the first SCI-2 445-a that may include SLFI. In this example, a second mini-slot 405-b may include three symbols, which include PSCCH resources for a second mini-slot PSCCH 435-b and PSSCH resources for a second SCI-2 440-b; and a third mini-slot 405-c may include three symbols with include PSCCH resources for a third mini-slot PSCCH 435-c and PSSCH resources for a third SCI-2 440-c. A fourth mini-slot 405-d may include four symbols, which include PSCCH resources for a fourth mini-slot PSCCH 435-d and PSSCH resources that include a DMRS and a portion of a fourth SCI-2 440-d and a remaining portion of the fourth SCI-2 445-d.

In cases in which mini-slot SCI-2 440 and 445 to carry SLFI, the SLFI may include multiple-bit HARQ bits, sidelink CSI feedback, SR information, or any combinations thereof. For example, the SLFI may include multiple HARQ bits from a type-3 HARQ codebook (e.g., that is transmitted as part of sidelink operation in contention-based or unlicensed spectrum (SL-U)), or multiple bits from type-1/2 HARQ codebooks. The sidelink CSI feedback may include, for example, a rank indicator (RI), a channel quality indicator (CQI), and the like. In some cases, a SCI-2 format may be defined to carry CSI and ACK/NACK feedback, or ANK/NACK only. In some cases, such an SCI-2 format may include SLFI only, and no data (e.g., there is no data piggybacked with the SLFI). In such cases, the SCI-2 format may include SLFI only and a source/destination ID. The source/destination ID may allow for distributed transmit/receive pairs with overlapping allocations of mini-slot resources for SLFI. In some cases, the SLFI only SCI-2 may be rate-matched to all PSSCH resource elements (REs) of the mini-slot PSSCH (e.g., sPSSCH). In other cases, the UE that is providing the SLFI may also have data to transmit, and the data may be transmitted with SLFI piggybacking in sPSSCH/PSSCH scheduling SCI-2. In some cases, the SCI-2 format for SLFI reporting may carry a SCI-2 field for scheduling sPSSCH transmission (e.g., HARQ ID, new data indicator (NDI), redundancy version (RV), Source/Destination ID, cast type indicator (such as multicast, unicast, etc.), HARQ enable/disable, CSI request, or any combinations thereof). Further, the SCI-2 format may include an offset value (e.g., K1 value) and resource index for SLFI of the scheduled sPSSCH transmission.

In some cases, the SCI-2 format for reporting SLFI may be signaled in cases where SCI-1 uses a legacy format. In some cases, the SCI-2 format for reporting SLFI may be indicated in a 2-bit SCI-2 format field of the SCI-2. In other cases, the SCI-2 format for reporting SLFI may be indicated by reusing a DMRS pattern indication that would otherwise be invalid for mini-slot communications. For example, the DMRS pattern is indicated in a DMRS pattern field that includes $[\log_2 N_{pattern}]$ bits, where $N_{pattern}$ is the number of available DMRS patterns (e.g., configured by higher layer parameter sl-PSSCH-DMRS-TimePatternList). As mini-slot RPs may only support front loaded DMRS patterns, a codepoint for signaling non-supported DMRS patterns may be reused to signal the different SCI-2 format that includes SLFI. In other examples, SLFI may be provided in a SCI-1 format, such as discussed with reference to FIG. 5.

Figure 5:
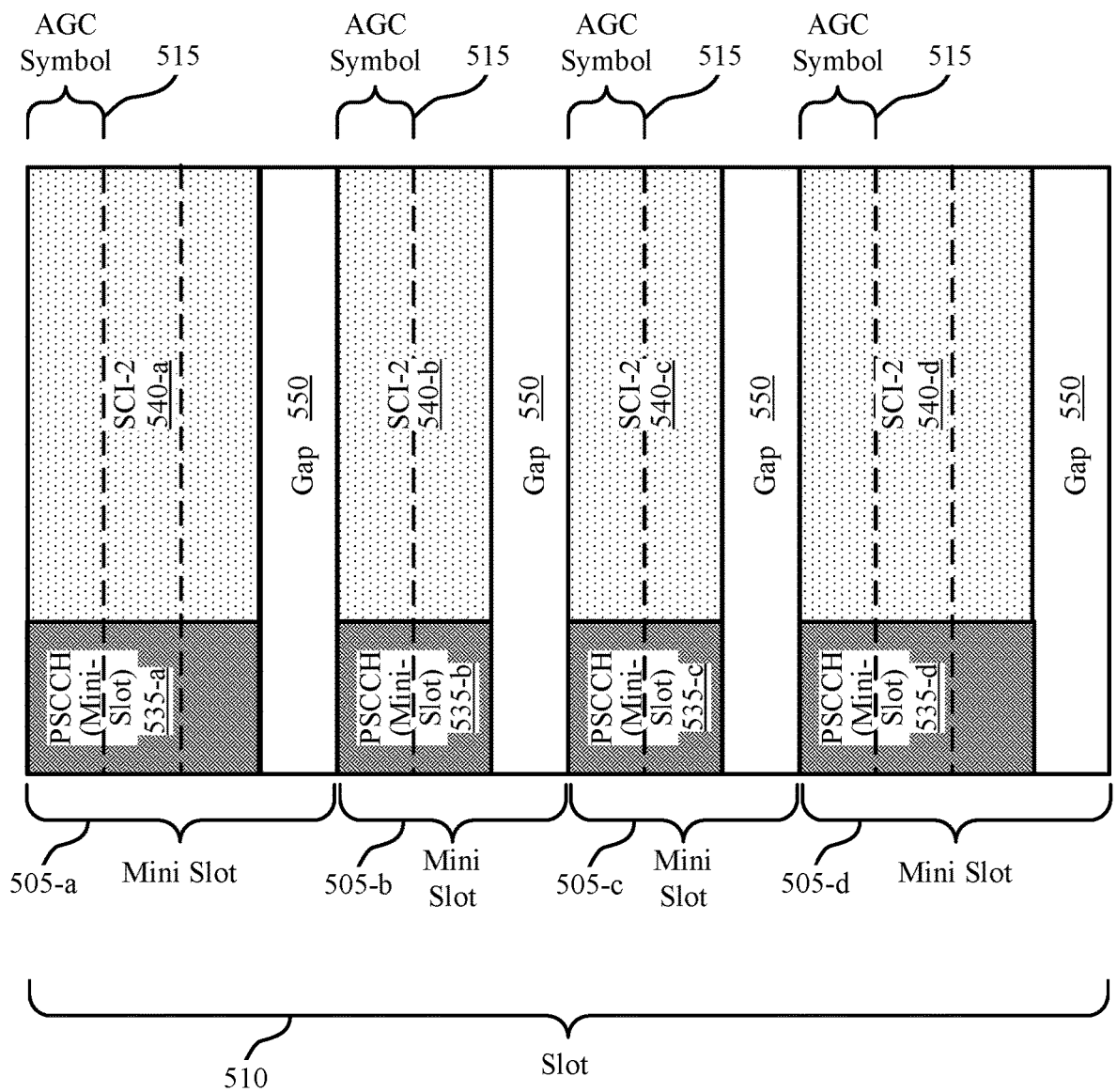
FIG. 5 illustrates an example of sidelink feedback via control channel transmissions in accordance with aspects of the present disclosure.

FIG. 5 illustrates an example of a sidelink feedback via control channel transmissions 500 that support sidelink feedback techniques in sidelink wireless communications in accordance with aspects of the present disclosure. In some examples, the sidelink feedback via control channel transmissions 500 may support communications in aspects of wireless communications systems 100 or 200. In this example, a number of mini-slots 505 may configured in a RP, where a slot 510 may include multiple mini-slots 505. In this example, each mini-slot 505 may include an AGC symbol 515 and a gap symbol 550. In this example, the mini-slots 505 may include SLFI in SCI-1 520 transmissions. Mini-slots 505 may include SCI-1 520 resources and SCI-2 resources 525.

In the example of FIG. 5, a first mini-slot 505-a may include four symbols, the first three of which may include PSCCH resources for a mini-slot PSCCH that includes SLFI in a first SCI-1 535-a, and PSSCH resources that include a first SCI-2 540-a (and may include DMRS). In this example, a second mini-slot 505-b may include three symbols, which include PSCCH resources for a second mini-slot PSCCH that includes SLFI in a second SCI-1 535-b and PSSCH resources for a second SCI-2 540-b; and a third mini-slot 505-c may include three symbols with include PSCCH resources for a third SCI-1 535-c and PSSCH resources for a third SCI-2 540-c. A fourth mini-slot 505-d may include four symbols, which include PSCCH resources for a fourth SCI-1 535-d and PSSCH resources for a fourth SCI-2 540-d.

In some examples, SCI-1 535 may include SLFI, and the SLFI may include multiple-bit HARQ bits, sidelink CSI feedback, SR information, or any combinations thereof. For example, the SLFI may include multiple HARQ bits from a type-3 HARQ codebook, or multiple bits from type-1/2 HARQ codebooks. The sidelink CSI feedback may include, for example, RI, CQI, and the like. In some cases, a SCI-1 535 format may be defined to carry CSI and ACK/NACK feedback, or ANK/NACK only. In some cases, such an SCI-1 format may include SLFI only, and no data (e.g., there is no data piggybacked with the SLFI). In some cases, the mini-slot PSCCH may be configured with a relatively small number of resource blocks (RBs) (e.g., 10RB) that may span across all symbols in each mini-slot 505. The symbol duration of PSCCH for SLFI may or may not be the same as data scheduling PSCCH. If the symbol duration is different, the receiver may need two decoding hypotheses in the SLFI resources if overlapping data and sidelink resources are allowed. In some cases, a SCI-1 format that includes SLFI may have a same payload size as the legacy SCI-1 formats, which may allow a receiver to blind decode using the same decoding hypotheses for different SCI-1 formats. In some cases, the SCI-1 535 cyclic redundancy check (CRC) may be scrambled with a radio network temporary identifier (RNTI) that is associated with SLFI for the receiver. Such CRC scrambling may allow for unambiguous identification of SLFI. The SLFI in SCI-1 535 may include, as discussed, ACK/NACK bits, CSI information, SR information, or any combinations thereof.

Further, in some cases, transmitting and receiving devices may be distributed and use the same sidelink RP, and such distributed transmit-receive pairs may have resource collisions. In some cases, to solve such a resource collision issue, a source ID may be included in the SCI-1 535. In such cases, the transmitting device may select orthogonal SLFI resources for its receiving devices via SCI-2 scheduling, and the receiving device may include the transmitting devices source ID in the SLFI to avoid confusion among different transmitters. In other cases, a SLFI RNTI may be provided per transmitting device (e.g., instead of being common for SLFI use). In such cases, the transmitting device may select orthogonal SLFI resource for its different receivers via SCI-2 scheduling, and the SLFI-RNTI may be a function of transmitting device source ID to differentiate SLFI from different transmit-receive pairs. The transmitting device, in some cases, may provide an indication of particular resources from a mini-slot RP, such as discussed for different examples with reference to FIGS. 6 and 7.

Figure 6:
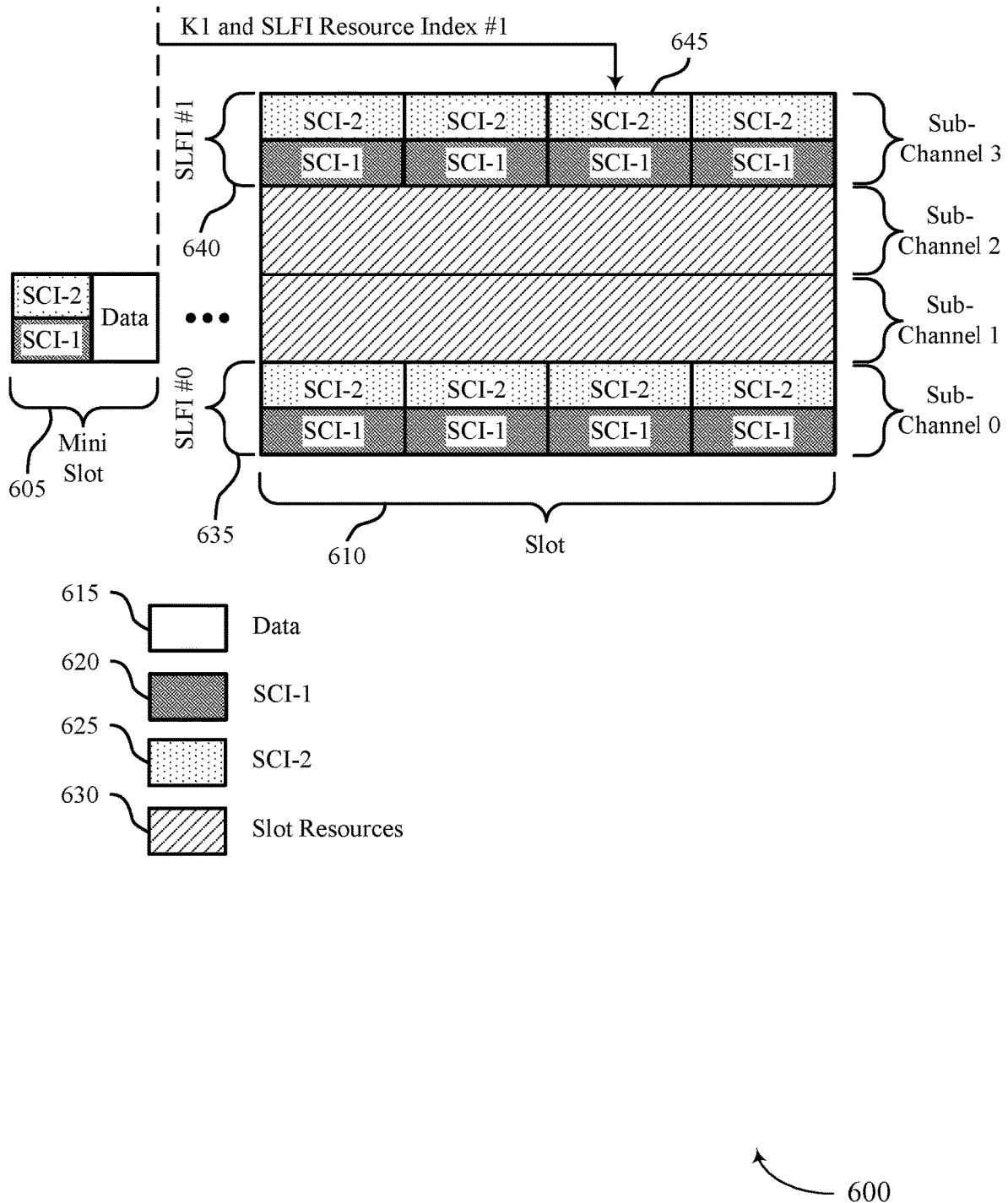
FIGS. 6 through 9 illustrate examples of sidelink feedback information resources that support sidelink feedback techniques in sidelink wireless communications in accordance with aspects of the present disclosure.

FIG. 6 illustrates an example of sidelink feedback information resources 600 that support sidelink feedback techniques in sidelink wireless communications in accordance with aspects of the present disclosure. In some examples, the sidelink feedback information resources 600 may support communications in aspects of wireless communications systems 100 or 200. In this example, a number of mini-slots may configured in a RP, where a slot 610 may include multiple mini-slots. In this example, a sidelink transmission of a first mini-slot 605 may include SCI-1 620, SCI-2 625, and data 615 resources, and slot 610 may have slot resources 630 that span a number of sub-channels and that each have associated mini-slot resources that include SCI-1 620 and SCI-2 625 resources.

In this example, SCI-1 620 resources within slot 610 may include SLFI, and the transmitting UE may assign SLFI resources within the mini-slot RP to its receiving devices based on a mapping of resources. In the example of FIG. 6, a first SLFI resource 635 (e.g., SLFI resource index #0) may be mapped to sub-channel 0 of the slot 610, and a second SLFI resource 640 (e.g., SLFI resource index #1) may be mapped to sub-channel 3 of the slot 610. A transmitting UE may provide an indication of an offset value (e.g., a K1 value that indicates a number of slots or mini-slots between first mini-slot 605 and slot 610) and the SLFI resource index, to unambiguously indicate SLFI resources, and assign orthogonal resources to different receiving devices. In the example of FIG. 6, a value of K1 and an indication of SLFI resource index #1 may identify mini-slot resource 645 for transmission of SLFI. In some cases, such resource mapping may be provided for SCI transmissions that include SLFI only in SCI-1 or SCI-2, and remaining resources (e.g., resources of sub-channel 1 and sub-channel 2 of slot 610) may be used for sidelink data transmissions or SCI in which SLFI is piggybacked with data. In some cases, a codepoint to indicate the SLFI resources in a data scheduling SCI-2 may indicate whether the SLFI is for ACK/NACK feedback, CSI feedback, SR indication, or combinations thereof. In some cases, the subchannels indicated for SLFI resources may be dynamically reused for mini-slot data transmissions as well.

Figure 7:
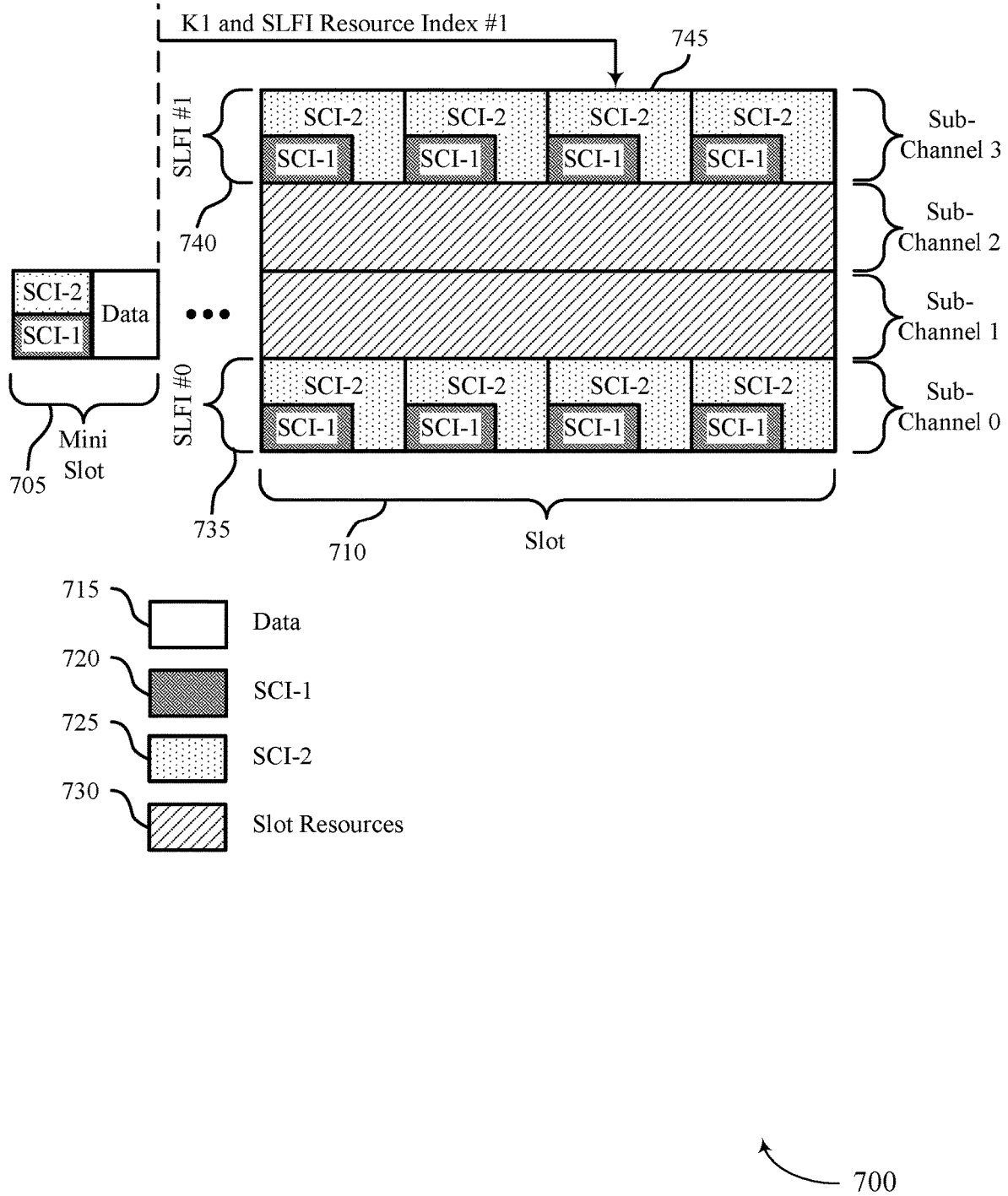

FIG. 7 illustrates an example of sidelink feedback information resources 700 that support sidelink feedback techniques in sidelink wireless communications in accordance with aspects of the present disclosure. In some examples, the sidelink feedback information resources 700 may support communications in aspects of wireless communications systems 100 or 200. In this example, a number of mini-slots may configured in a RP, where a slot 710 may include multiple mini-slots. In this example, a sidelink transmission of a first mini-slot 705 may include SCI-1 720, SCI-2 725, and data 715 resources, and slot 710 may have slot resources 730 that span a number of sub-channels and that each have associated mini-slot resources that include SCI-1 720 and SCI-2 725 resources.

In this example, SCI-2 725 resources within slot 710 may include SLFI, and similarly as discussed with reference to FIG. 6, the transmitting UE may assign SLFI resources within the mini-slot RP to its receiving devices based on a mapping of resources. In the example of FIG. 7, a first SLFI resource 735 (e.g., SLFI resource index #0) may be mapped to sub-channel 0 of the slot 710, and a second SLFI resource 740 (e.g., SLFI resource index #1) may be mapped to sub-channel 3 of the slot 710. A transmitting UE may provide an indication of an offset value (e.g., a K1 value that indicates a number of slots or mini-slots between first mini-slot 705 and slot 710) and the SLFI resource index, to unambiguously indicate SLFI resources, and assign orthogonal resources to different receiving devices. In the example of FIG. 7, a value of K1 and an indication of SLFI resource index #1 may identify mini-slot resource 745 for transmission of SLFI. In some cases, such resource mapping may be provided for SCI transmissions that include SLFI only in SCI-1 or SCI-2, and remaining resources (e.g., resources of sub-channel 1 and sub-channel 2 of slot 710) may be used for sidelink data transmissions or SCI in which SLFI is piggybacked with data. In some cases, a codepoint to indicate the SLFI resources in a data scheduling SCI-2 may indicate whether the SLFI is for ACK/NACK feedback, CSI feedback, SR indication, or combinations thereof. In some cases, the subchannels indicated for SLFI resources may be dynamically reused for mini-slot data transmissions as well.

In the examples of FIGS. 6 and 7, the data scheduling mini-slot SCI-2 that is provided in the first mini-slot (e.g., mini-slot 605 or 705) may indicate K1 and SLFI resource index, in which K1 indicates the mini-slot offset for the feedback and the SLFI resource index indicates the sub-channel for the SLFI (e.g., which is RRC configured). In some cases, non-numerical K1 can be also supported for type-3 codebook for SL-U, or a service area identification (SAI) field can be included to support dynamic HARQ codebooks. Further, in some cases, the data scheduling mini-slot SCI-2 that is provided in the first mini-slot may trigger CSI and may indicate a higher layer configured CSI configuration index. For example, the higher layer may configure multiple CSI configurations and each configuration may have an associated CSI configuration index value. Each CSI configuration may have, for example, a K1 value that indicates a CSI report feedback offset in mini-slots, a SLFI resource index for reporting CSI, CSI-RS resource index, or any combinations thereof. Once the receiving device receives the CSI triggering SCI-2, it knows where to report the CSI. In cases where there is a data mini-slot transmission at K1, the CSI report can piggyback in the mini-slot SCI-2 which schedules the data instead of transmitting on SLFI resource.

Figure 8:
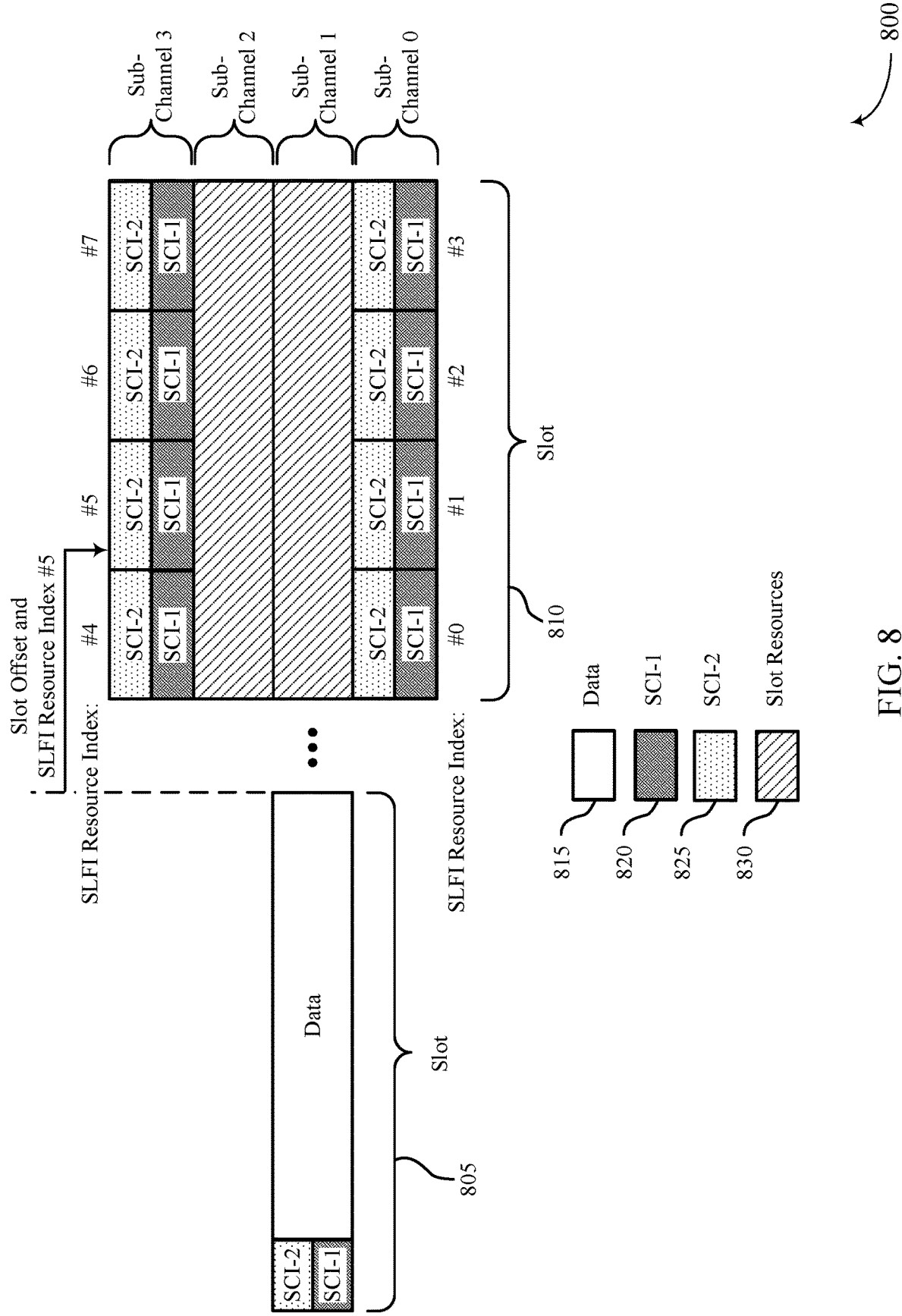
Figure 9:
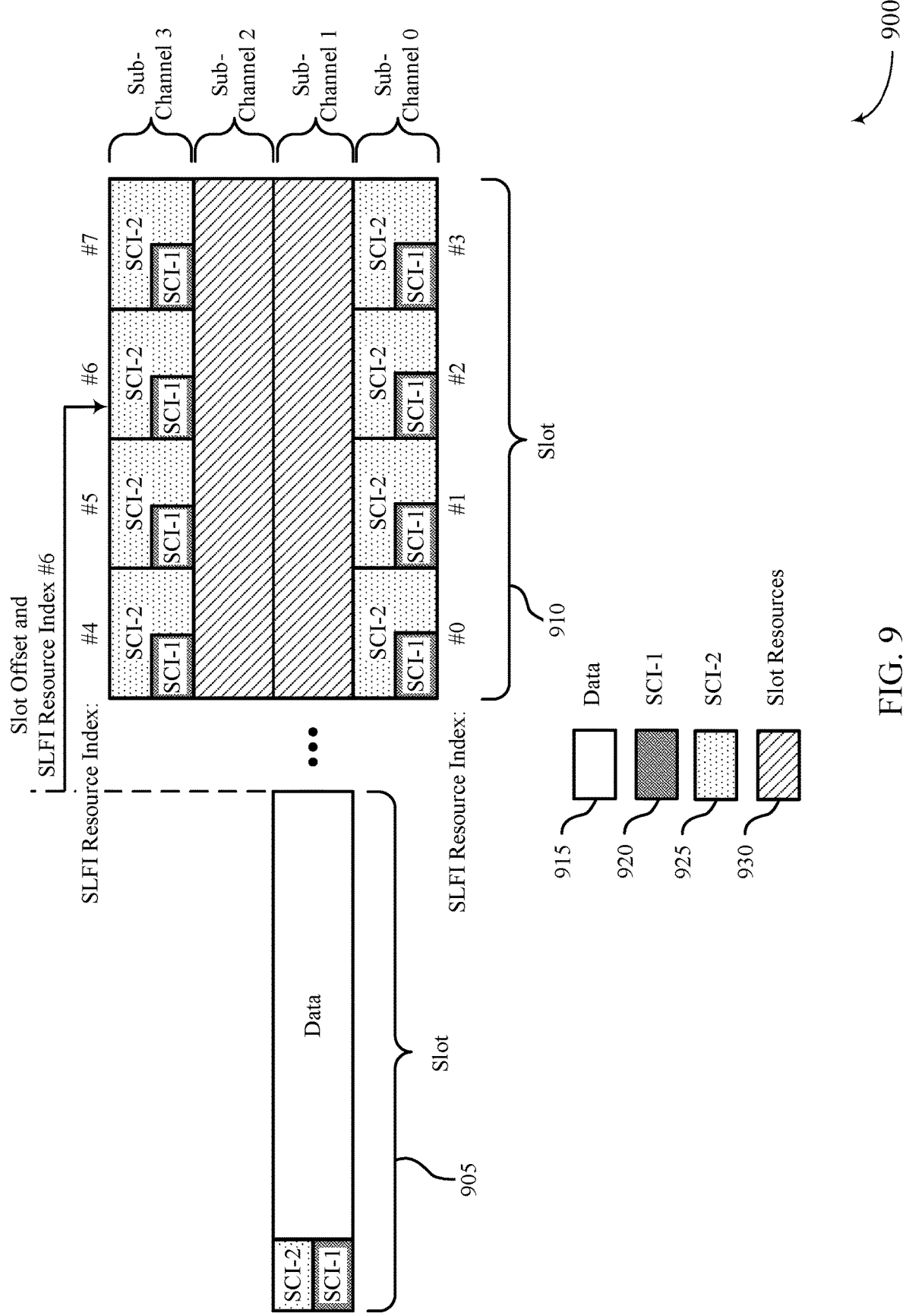

FIGS. 8 and 9 illustrate examples of sidelink feedback information resources 800 and 900 that support sidelink feedback techniques in sidelink wireless communications in accordance with aspects of the present disclosure. In some examples, the sidelink feedback information resources 800 and 900 may support communications in aspects of wireless communications systems 100 or 200. In these examples, feedback resources may be configured in a number of mini-slots in a RP, where a slot 810 and slot 910 may include multiple mini-slots. In these examples, a sidelink transmission of a first slot 805 and 905 may include SCI-1 820 and 920, SCI-2 825 and 925, and data 815 and 915 resources, and slot 810 and 910 may have slot resources 830 and 930 that span a number of sub-channels and that each have associated mini-slot resources that include SCI-1 820 and 902, and SCI-2 825 and 925 resources.

In the example of FIG. 8, SCI-1 resources 820 within slot 810 may include SLFI, and in the example of FIG. 9, SCI-2 resources 925 within slot 910 may include SLFI. In the examples of FIGS. 8 and 9, a slot based RP is configured for data transmission of slots 805 and 905, and mini-slot based SLFI resources are provided in slots 810 and 910 for sidelink feedback information.

In some cases, the transmitting UE may assign SLFI resources within the mini-slot RP to its receiving devices based on a mapping of resources, similarly as discussed with reference to FIGS. 6 and 7. In the examples of FIGS. 8 and 9, if a slot-based RP is configured for sidelink data transmissions, for SLFI only in SCI-1 or SCI-2, a mini-slot based SLFI resource configuration may be provided in the slot RP for SLFI. In some cases, in the slot-based RP, RRC configuration may be used to provide multiple SLFI resources with a mini-slot structure within a configured subchannel. In some cases, within a slot, there could be multiple mini-slot SLFI resources that are time division multiplexed, and higher layer configuration may configure SLFI resources to be in a subset of subchannels (e.g., sub-channel 0 and sub-channel 3 in the examples of FIGS. 8 and 9). Each SLFI resource may be mapped to a SLFI resource index, which may limit the codepoint in the data scheduling SCI-2 for ACK/NACK resource indication or CSI resource indication, and may allow the transmitting device to assign receiving devices with orthogonal SLFI resources. In some cases, the subchannels signaled for SLFI resources may be dynamically reused for slot data transmission as well, if no SLFI resources are used in that subchannel for a slot.

In some cases, the data scheduling slot SCI-2 (e.g., in slot 805 or 905) may indicate K1 and a SLFI resource index. The value of K1 may indicate a slot offset for the SLFI (e.g., as a number slots), and the SLFI resource index may be mapped to the mini-slot and subchannel for the SLFI, which may be configured in RRC signaling for example (or in a MAC-CE). In some cases, non-numerical K1 may be supported for type-3 codebook for SL-U, and a SAI field may be included to support dynamic HARQ codebooks. Additionally, or alternatively, the data scheduling slot SCI-2 may trigger a CSI report and may indicate a higher layer configured CSI configuration index. For example, higher layers (e.g., RRC or radio link control (RLC) layer) may configure multiple CSI configurations and each configuration may have an associated CSI configuration index that may include a K1 value of a CSI report feedback offset in slots, a SLFI resource index for reporting CSI, and a CSI-RS resource index. Once the receiving device receives the CSI triggering SCI-2, the resources for reporting the CSI may be identified. If there is a data slot transmission at K1, the CSI report may be piggybacked in the slot SCI-2 which schedules the data instead of transmitting on the SLFI resource.

Figure 10:
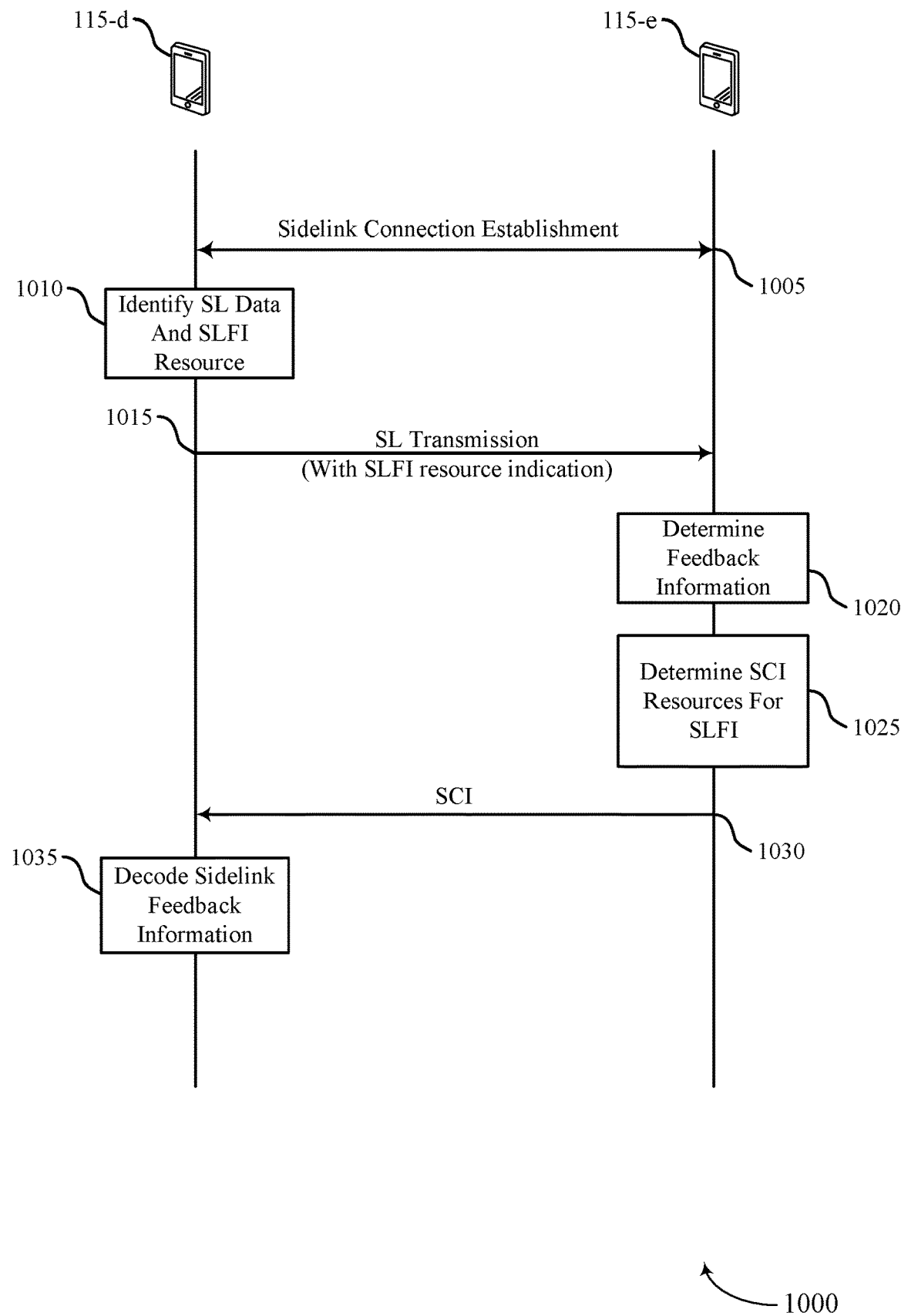
FIG. 10 illustrates an example of a process flow that supports sidelink feedback techniques in sidelink wireless communications in accordance with aspects of the present disclosure.

FIG. 10 illustrates an example of a process flow 1000 that supports sidelink feedback techniques in sidelink wireless communications in accordance with aspects of the present disclosure. In some examples, the process flow 1000 may implement aspects of a wireless communications systems 100 or 200 of FIG. 1 or 2, and may implement aspects described in examples of FIGS. 3 through 9. The process flow 1000 may include a first UE 115-d and a second UE 115-e, which may be examples of the corresponding devices described herein. Alternative examples of the following may be implemented where some processes are performed in a different order than described or not performed at all. In some implementations, processes may include additional features not mentioned below, or further processes may be added.

At 1005, the first UE 115-d and the second UE 115-e may establish a sidelink connection. In some cases, the sidelink connection may be a mode 1 or mode 2 sidelink connection, and sidelink resources may be configured in a slot-based RP or mini-slot based RP. In some cases, as part of the establishment of the sidelink connection, configuration information may be exchanged that indicates one or more CSI configurations, mapping for SLFI resources, or any combinations thereof, as discussed with reference to FIGS. 2 through 9.

At 1010, the first UE may identify sidelink data to be transmitted to the second UE 115-e, and a SLFI resource for a feedback transmission of the second UE 115-e. In some cases, the SLFI resource may be a mini-slot based resource, and the sidelink resource pool may be a slot-based resource pool or a mini-slot based resource pool. At 1015, the first UE 115-d may transmit the sidelink transmission to the second UE 115-e. In some cases, the sidelink transmission may include SCI-1 and SCI-2, which may indicate SLFI resources as discussed herein.

At 1020, the second UE 115-e may determine feedback information based on the sidelink transmission from the first UE 115-d. In some cases, the feedback information may include HARQ ACK/NACK feedback, CSI feedback, SR information, or any combinations thereof. At 1025, the second UE may determine the SCI resources for transmitting the SLFI. In some case, the SCI resource may be determined based on an offset value (e.g., a K1 value) and a SLFI resource index value, such as discussed herein with reference to FIGS. 2 through 9. At 1030, the second UE 115-e may transmit the SCI with the SLFI to the first UE 115-d. At 1035, the first UE 115-d may decode the SLFI from the SCI that is transmitted by the second UE 115-e. In some cases, the SLFI may be decoded based on a source/destination ID that is provided with the SLFI.

Figure 11:
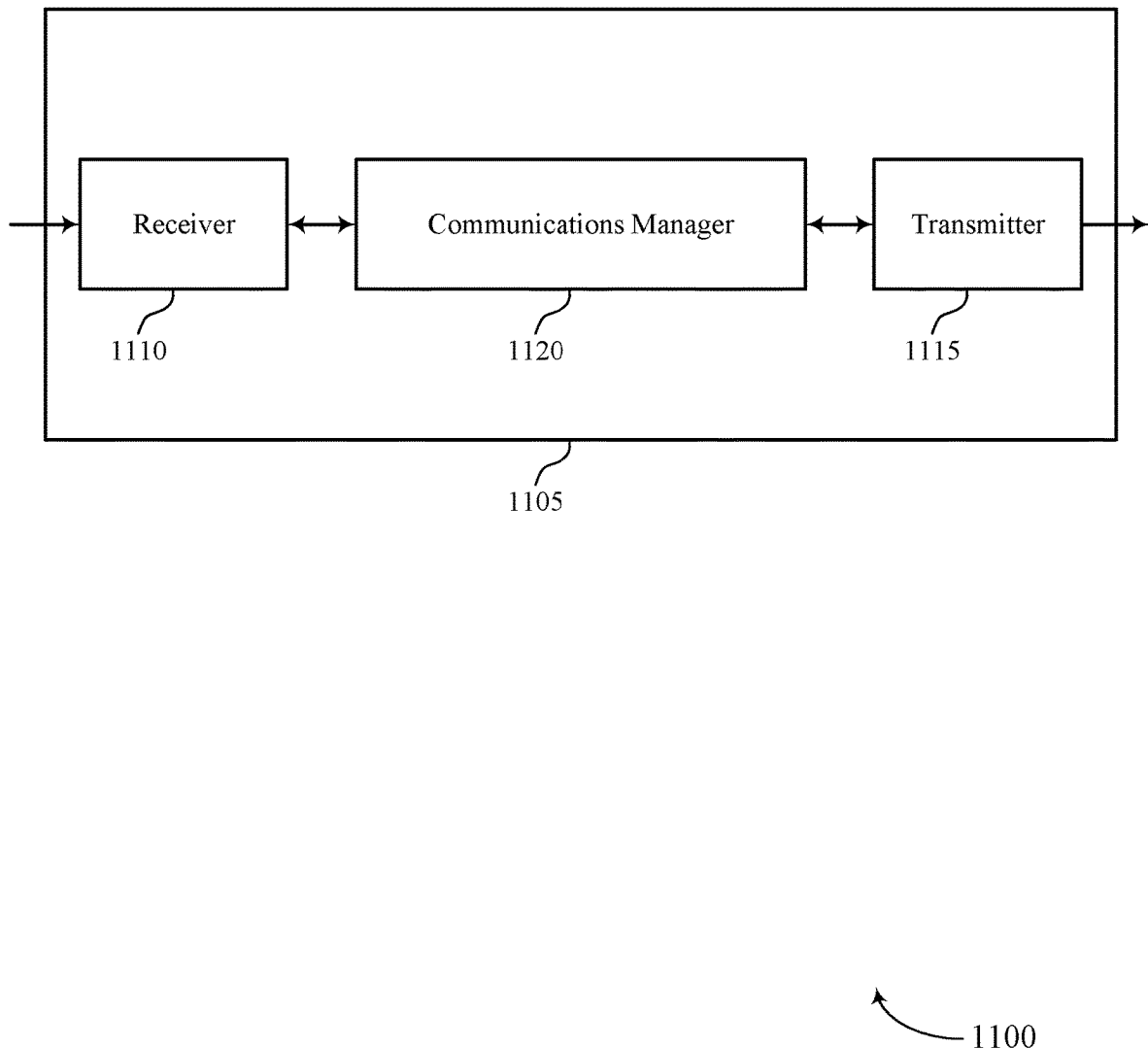
FIGS. 11 and 12 show block diagrams of devices that support sidelink feedback techniques in sidelink wireless communications in accordance with aspects of the present disclosure.

FIG. 11 shows a block diagram 1100 of a device 1105 that supports sidelink feedback techniques in sidelink wireless communications in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to sidelink feedback techniques in sidelink wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to sidelink feedback techniques in sidelink wireless communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of sidelink feedback techniques in sidelink wireless communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first UE in accordance with examples as disclosed herein. For example, the communications manager 1120 may be configured as or otherwise support a means for transmitting, to a second UE, a first sidelink communication in a first slot of a set of sidelink resources, the first slot having a first slot duration of at least two available slot durations for sidelink communications. The communications manager 1120 may be configured as or otherwise support a means for receiving, from the second UE responsive to the first sidelink communication, sidelink control information in a second slot of the set of sidelink resources, the second slot having the first slot duration, and where the sidelink control information includes one or more types of sidelink feedback information.

Additionally or alternatively, the communications manager 1120 may support wireless communications in accordance with examples as disclosed herein. For example, the communications manager 1120 may be configured as or otherwise support a means for receiving, at a second UE from a first UE, a first sidelink communication in a first slot of a set of sidelink resources, the first slot having a first slot duration of at least two available slot durations for sidelink communications. The communications manager 1120 may be configured as or otherwise support a means for determining feedback information associated with the first sidelink communication. The communications manager 1120 may be configured as or otherwise support a means for transmitting, to the first UE, sidelink control information that includes the feedback information, the sidelink control information transmitted in a second slot of the set of sidelink resources that has the first slot duration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for sidelink feedback using sidelink control information, which may provide reduced latency for sidelink communications, higher data rates, and enhanced reliability.

Figure 12:
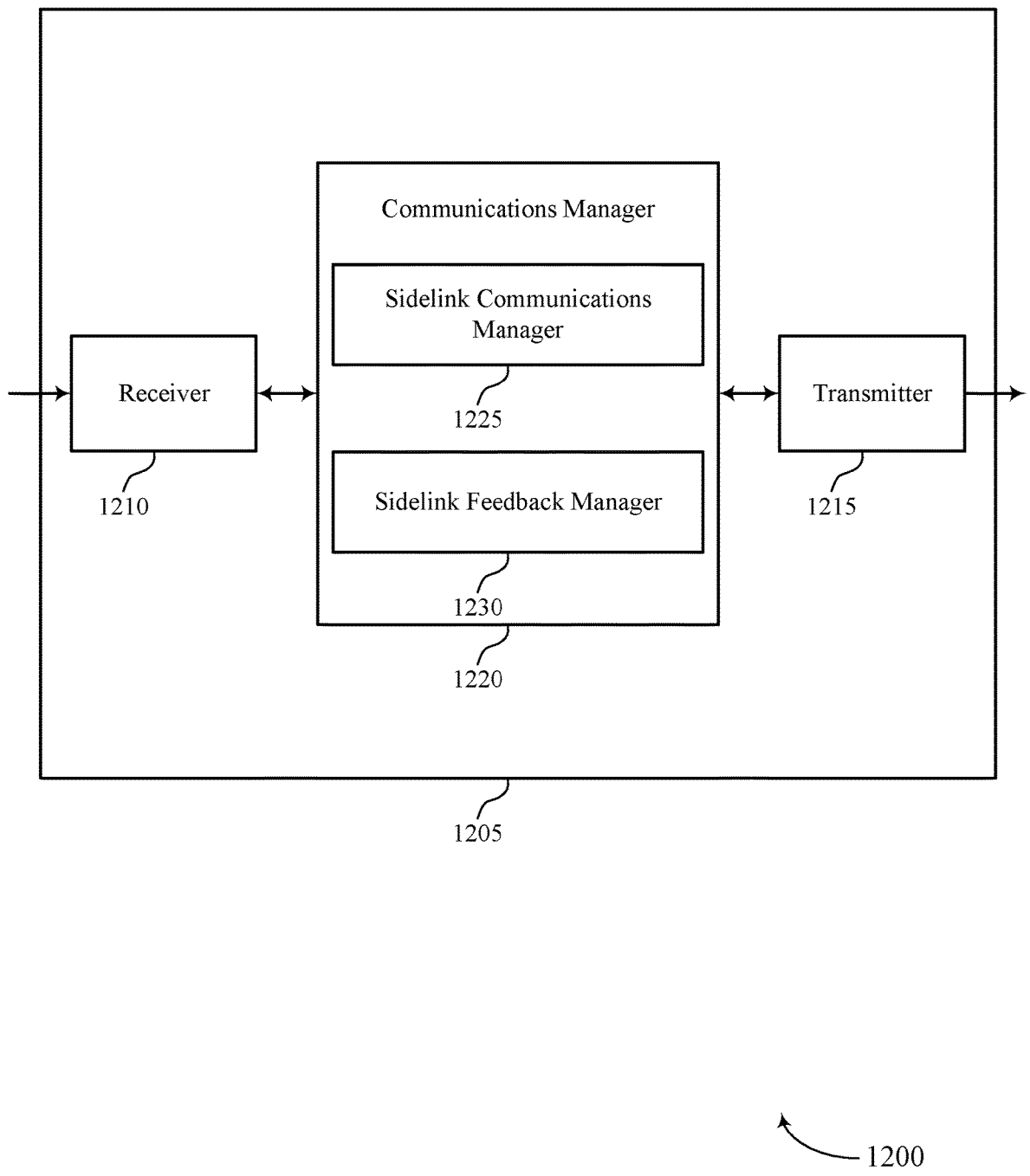

FIG. 12 shows a block diagram 1200 of a device 1205 that supports sidelink feedback techniques in sidelink wireless communications in accordance with aspects of the present disclosure. The device 1205 may be an example of aspects of a device 1005 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to sidelink feedback techniques in sidelink wireless communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to sidelink feedback techniques in sidelink wireless communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of sidelink feedback techniques in sidelink wireless communications as described herein. For example, the communications manager 1220 may include a sidelink communications manager 1225 a sidelink feedback manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first UE in accordance with examples as disclosed herein. The sidelink communications manager 1225 may be configured as or otherwise support a means for transmitting, to a second UE, a first sidelink communication in a first slot of a set of sidelink resources, the first slot having a first slot duration of at least two available slot durations for sidelink communications. The sidelink feedback manager 1230 may be configured as or otherwise support a means for receiving, from the second UE responsive to the first sidelink communication, sidelink control information in a second slot of the set of sidelink resources, the second slot having the first slot duration, and where the sidelink control information includes one or more types of sidelink feedback information.

Additionally or alternatively, the communications manager 1220 may support wireless communications in accordance with examples as disclosed herein. The sidelink communications manager 1225 may be configured as or otherwise support a means for receiving, at a second UE from a first UE, a first sidelink communication in a first slot of a set of sidelink resources, the first slot having a first slot duration of at least two available slot durations for sidelink communications. The sidelink feedback manager 1230 may be configured as or otherwise support a means for determining feedback information associated with the first sidelink communication. The sidelink feedback manager 1230 may be configured as or otherwise support a means for transmitting, to the first UE, sidelink control information that includes the feedback information, the sidelink control information transmitted in a second slot of the set of sidelink resources that has the first slot duration.

Figure 13:
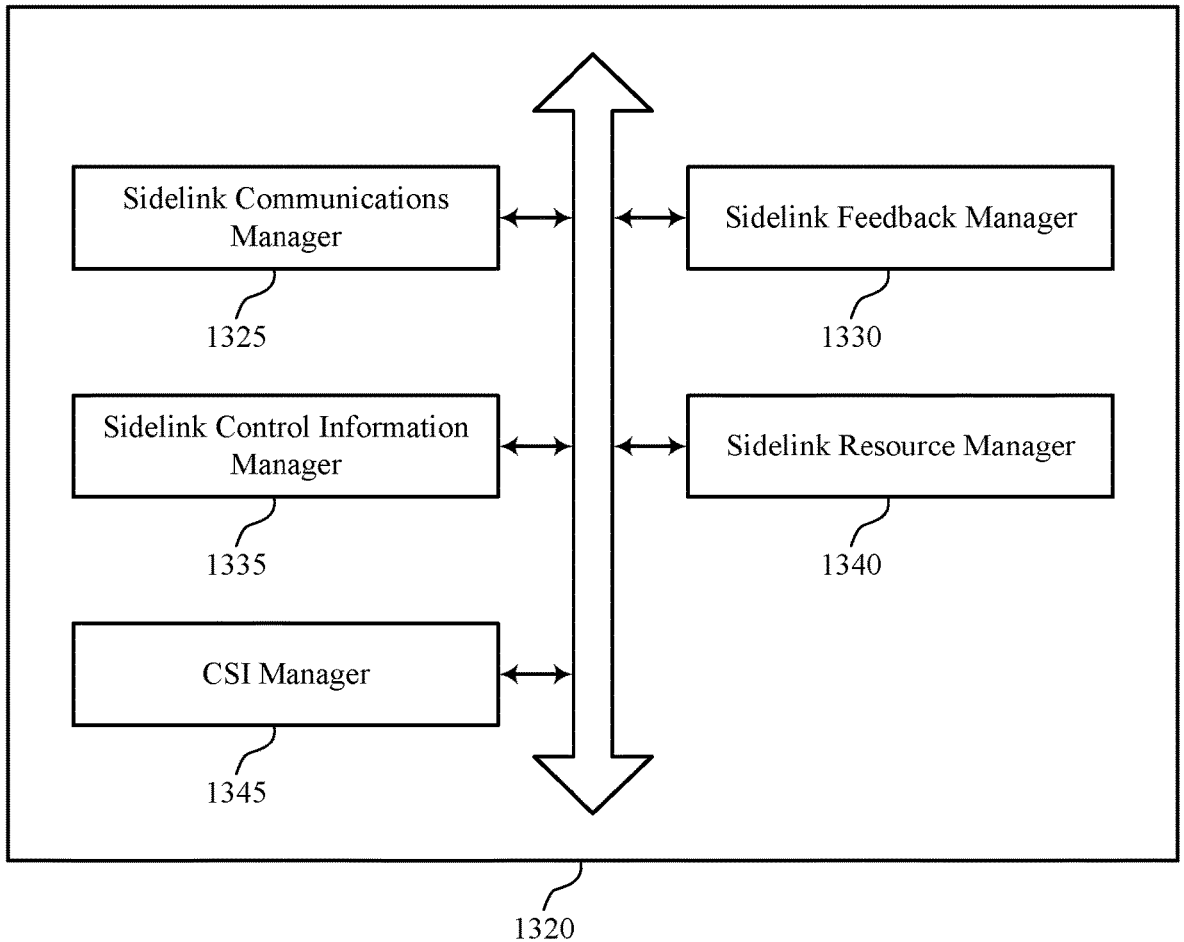
FIG. 13 shows a block diagram of a communications manager that supports sidelink feedback techniques in sidelink wireless communications in accordance with aspects of the present disclosure.

FIG. 13 shows a block diagram 1300 of a communications manager 1320 that supports sidelink feedback techniques in sidelink wireless communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of sidelink feedback techniques in sidelink wireless communications as described herein. For example, the communications manager 1320 may include a sidelink communications manager 1325, a sidelink feedback manager 1330, a sidelink control information manager 1335, a sidelink resource manager 1340, a CSI manager 1345, or any combination thereof. Each of these components may communicate, directly or indirectly, with one another (e.g., via one or more buses).

The communications manager 1320 may support wireless communication at a first UE in accordance with examples as disclosed herein. The sidelink communications manager 1325 may be configured as or otherwise support a means for transmitting, to a second UE, a first sidelink communication in a first slot of a set of sidelink resources, the first slot having a first slot duration of at least two available slot durations for sidelink communications. The sidelink feedback manager 1330 may be configured as or otherwise support a means for receiving, from the second UE responsive to the first sidelink communication, sidelink control information in a second slot of the set of sidelink resources, the second slot having the first slot duration, and where the sidelink control information includes one or more types of sidelink feedback information.

In some examples, the sidelink control information is first stage sidelink control information (SCI-1) or second stage sidelink control information (SCI-2), and the one or more types of sidelink feedback information include ACK/NACK feedback associated with the first sidelink communication, CSI feedback, a SR, or any combinations thereof. In some examples, the sidelink control information is received in a shared channel transmission from the second UE that does not include an associated data transmission, and the sidelink control information includes the one or more types of sidelink feedback information and a source/destination identification that indicates one or more of the first UE or the second UE.

In some examples, the sidelink resource manager 1340 may be configured as or otherwise support a means for determining that the sidelink control information in the second slot is associated with the second UE based on the source/destination identification, and where one or more other UEs having different source/destination identifications are allocated with overlapping resources of the set of sidelink resources. In some examples, the sidelink control information is rate-matched to all resource elements (REs) of the shared channel transmission. In some examples, the sidelink control information is received in a shared channel transmission from the second UE that also includes an associated data transmission, and the sidelink control information further includes scheduling information that indicates resources for the first UE to transmit feedback information to the second UE associated with the data transmission. In some examples, the scheduling information includes a slot offset value that indicates a number of slots between the shared channel transmission and the sidelink control information transmission, and a resource index that indicates a transmission resource for the sidelink control information transmission.

In some examples, the sidelink control information manager 1335 may be configured as or otherwise support a means for determining that the sidelink control information is included in a second stage sidelink control information transmission in the second slot based on a format field in a first stage sidelink control information transmission in the second slot.

In some examples, the sidelink control information manager 1335 may be configured as or otherwise support a means for determining that the sidelink control information is included in a second stage sidelink control information transmission in the second slot based on a reference signal pattern that is indicated for the second slot.

In some examples, the sidelink control information is received in a sidelink control channel transmission from the second UE that does not include scheduling information for an associated data transmission, and where the sidelink control channel transmission is transmitted in one or more resource blocks that span all symbols of the second slot. In some examples, a symbol duration for the sidelink control channel transmission is a same symbol duration or a different symbol duration than a control channel transmissions that include scheduling information for data transmissions. In some examples, the sidelink control channel transmission has a same payload size as a control channel transmission that includes scheduling information for a data transmission.

In some examples, the sidelink feedback manager 1330 may be configured as or otherwise support a means for determining that the sidelink feedback information is included in a first stage sidelink control information transmission in the second slot based on a CRC of the sidelink control information being scrambled with an identifier associated with the sidelink feedback information. In some examples, the sidelink control information includes the one or more types of sidelink feedback information and an identification of the first UE. In some examples, the identifier used for scrambling the CRC is a unique identifier associated with the first UE.

In some examples, the sidelink control information is transmitted within the second slot in resources that are mapped to a first configured subchannel of a set of multiple configured subchannels within the set of sidelink resources, and where each of the plurality configured subchannels has an associated resource index. In some examples, the first sidelink communication indicates an offset between the first slot and the second slot, and a first index value that indicates the first configured subchannel. In some examples, the offset between the first slot and the second slot is a non-numerical offset that indicates sidelink feedback information for two or more slots are to be transmitted to the first UE in a same sidelink control information transmission. In some examples, the one or more types of sidelink feedback information includes CSI feedback, and where the first sidelink communication indicates resources for transmission of the CSI feedback and includes a trigger to initiate CSI measurement at the second UE.

In some examples, the set of sidelink resources include a set of multiple sidelink resources that are allocated according to a second slot duration of the at least two available slot durations for sidelink communications, where the first slot duration is shorter than the second slot duration. In some examples, a subset of the set of sidelink resources is configured for sidelink control information transmissions according to the first slot duration. In some examples, the first sidelink communication schedules one or more sidelink communications according to the second slot duration, and indicates an offset between the first slot and the second slot and a first index value that indicates resources for the sidelink control information based on the first slot duration. In some examples, the one or more types of sidelink feedback information includes CSI feedback, and where the first sidelink communication indicates resources for transmission of the CSI feedback based on the first slot duration and includes a trigger to initiate CSI measurement at the second UE.

Additionally or alternatively, the communications manager 1320 may support wireless communications in accordance with examples as disclosed herein. In some examples, the sidelink communications manager 1325 may be configured as or otherwise support a means for receiving, at a second UE from a first UE, a first sidelink communication in a first slot of a set of sidelink resources, the first slot having a first slot duration of at least two available slot durations for sidelink communications. In some examples, the sidelink feedback manager 1330 may be configured as or otherwise support a means for determining feedback information associated with the first sidelink communication. In some examples, the sidelink feedback manager 1330 may be configured as or otherwise support a means for transmitting, to the first UE, sidelink control information that includes the feedback information, the sidelink control information transmitted in a second slot of the set of sidelink resources that has the first slot duration.

In some examples, the sidelink control information is SCI-1 or SCI-2, and the sidelink feedback information includes one or more of acknowledgment/negative-acknowledgment feedback associated with the first sidelink communication, CSI feedback, a SR, or any combinations thereof. In some examples, the sidelink control information is transmitted in a shared channel transmission from the second UE that does not include an associated data transmission, and the sidelink control information includes the sidelink feedback information and a source/destination identification that indicates one or more of the first UE or the second UE. In some examples, the sidelink control information is transmitted in a shared channel transmission that also includes an associated data transmission, and the sidelink control information further includes scheduling information that indicates resources for the first UE to transmit feedback information to the second UE associated with the data transmission.

Figure 14:
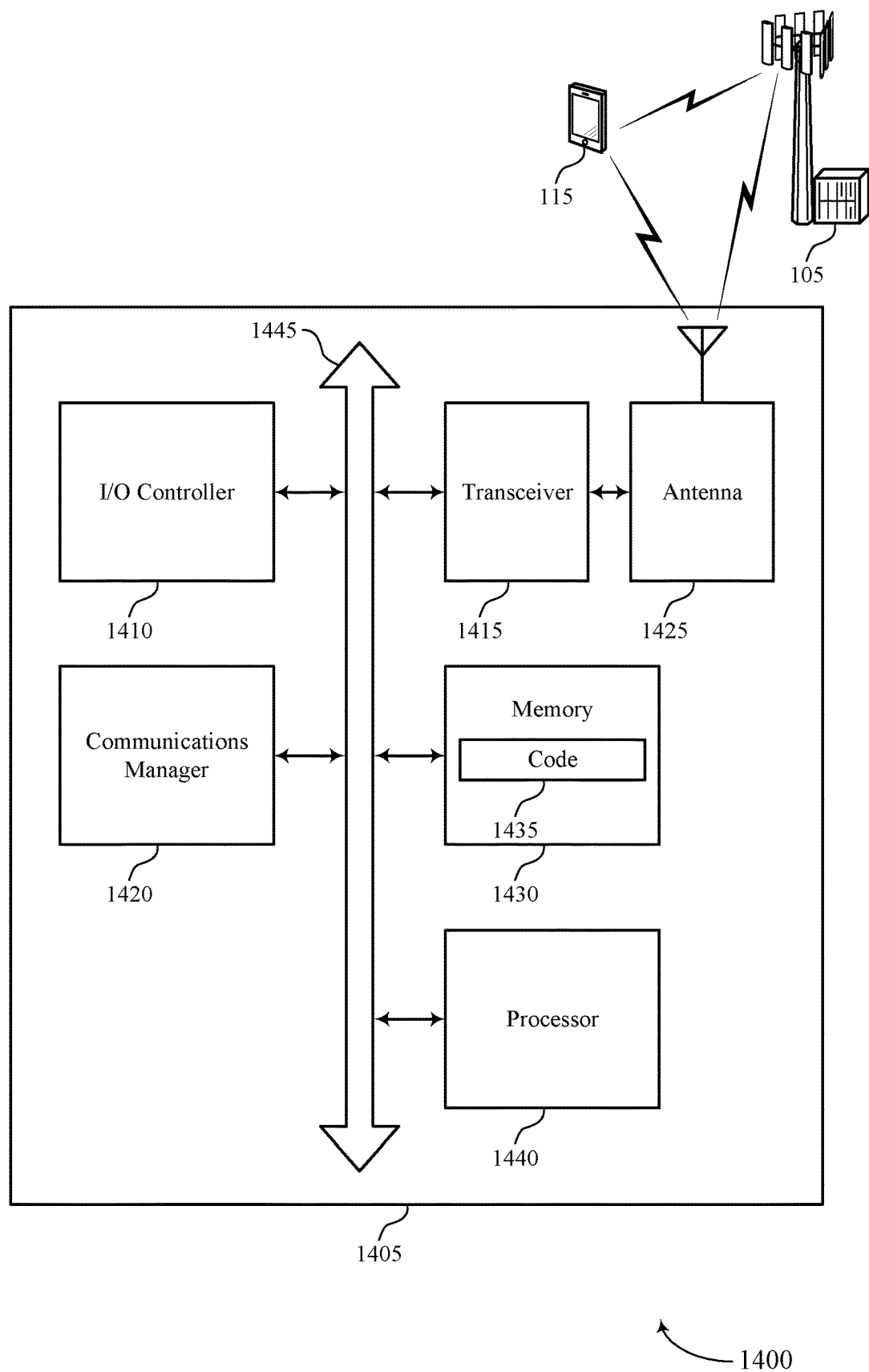
FIG. 14 shows a diagram of a system including a device that supports sidelink feedback techniques in sidelink wireless communications in accordance with aspects of the present disclosure.

FIG. 14 shows a diagram of a system 1400 including a device 1405 that supports sidelink feedback techniques in sidelink wireless communications in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting sidelink feedback techniques in sidelink wireless communications). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a first UE in accordance with examples as disclosed herein. For example, the communications manager 1420 may be configured as or otherwise support a means for transmitting, to a second UE, a first sidelink communication in a first slot of a set of sidelink resources, the first slot having a first slot duration of at least two available slot durations for sidelink communications. The communications manager 1420 may be configured as or otherwise support a means for receiving, from the second UE responsive to the first sidelink communication, sidelink control information in a second slot of the set of sidelink resources, the second slot having the first slot duration, and where the sidelink control information includes one or more types of sidelink feedback information.

Additionally or alternatively, the communications manager 1420 may support wireless communications in accordance with examples as disclosed herein. For example, the communications manager 1420 may be configured as or otherwise support a means for receiving, at a second UE from a first UE, a first sidelink communication in a first slot of a set of sidelink resources, the first slot having a first slot duration of at least two available slot durations for sidelink communications. The communications manager 1420 may be configured as or otherwise support a means for determining feedback information associated with the first sidelink communication. The communications manager 1420 may be configured as or otherwise support a means for transmitting, to the first UE, sidelink control information that includes the feedback information, the sidelink control information transmitted in a second slot of the set of sidelink resources that has the first slot duration.

By including or configuring the communications manager 1420 in accordance with examples as described herein, the device 1405 may support techniques for sidelink feedback using sidelink control information, which may provide reduced latency for sidelink communications, higher data rates, and enhanced reliability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of sidelink feedback techniques in sidelink wireless communications as described herein, or the processor 1440 and the memory 1430 may be otherwise configured to perform or support such operations.

Figure 15:
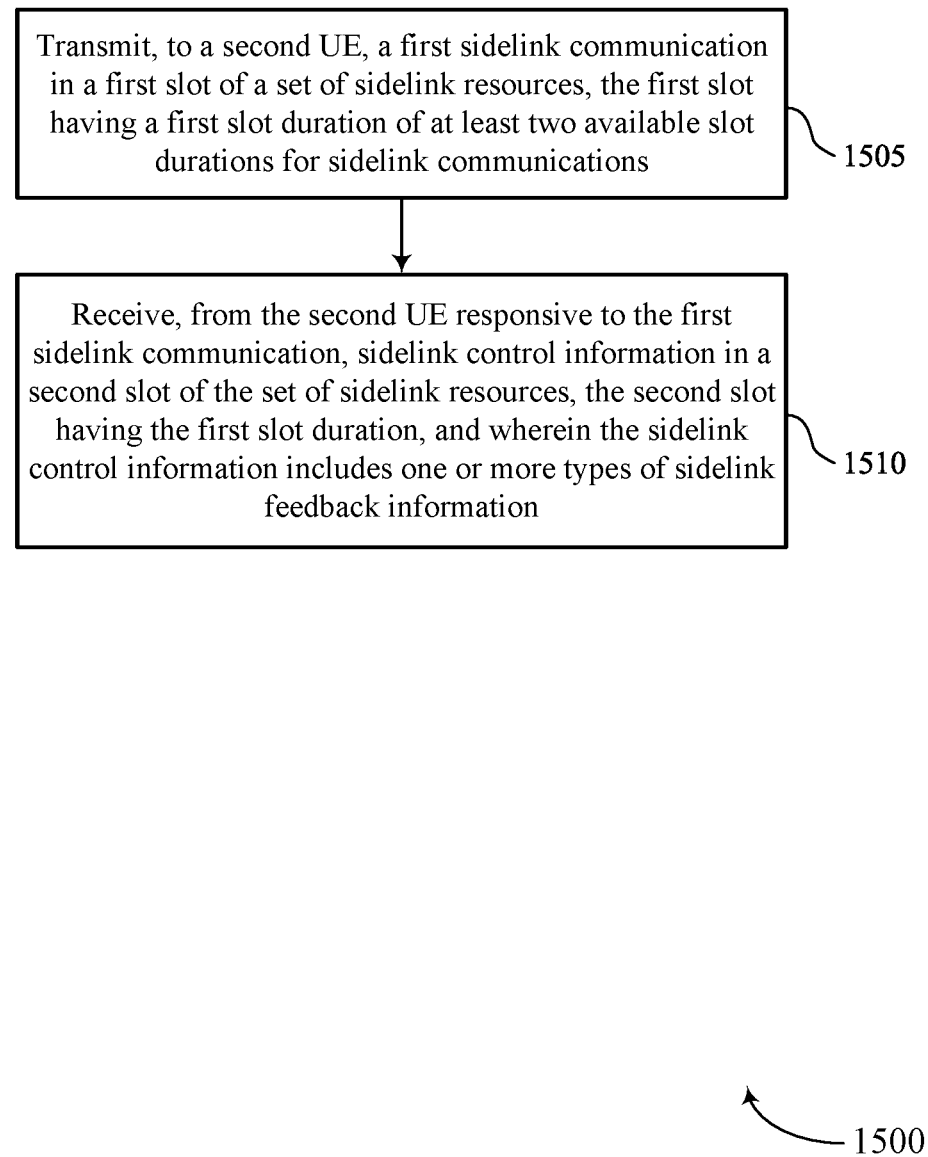
FIGS. 15 through 19 show flowcharts illustrating methods that support sidelink feedback techniques in sidelink wireless communications in accordance with aspects of the present disclosure.

FIG. 15 shows a flowchart illustrating a method 1500 that supports sidelink feedback techniques in sidelink wireless communications in accordance with aspects of the present disclosure. The operations of the method 1500 may be implemented by a UE or its components as described herein. For example, the operations of the method 1500 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1505, the method may include transmitting, to a second UE, a first sidelink communication in a first slot of a set of sidelink resources, the first slot having a first slot duration of at least two available slot durations for sidelink communications. The operations of 1505 may be performed in accordance with examples as disclosed herein. In some examples, aspects of the operations of 1505 may be performed by a sidelink communications manager 1325 as described with reference to FIG. 13.

At 1510, the method may include receiving, from the second UE responsive to the first sidelink communication, sidelink control information in a second slot of the set of sidelink resources, the second slot having the first slot duration, and where the sidelink control information includes one or more types of sidelink feedback information. The operations of 1510 may be performed in accordance with examples as disclosed herein. In some examples, aspects of the operations of 1510 may be performed by a sidelink feedback manager 1330 as described with reference to FIG. 13.

Figure 16:
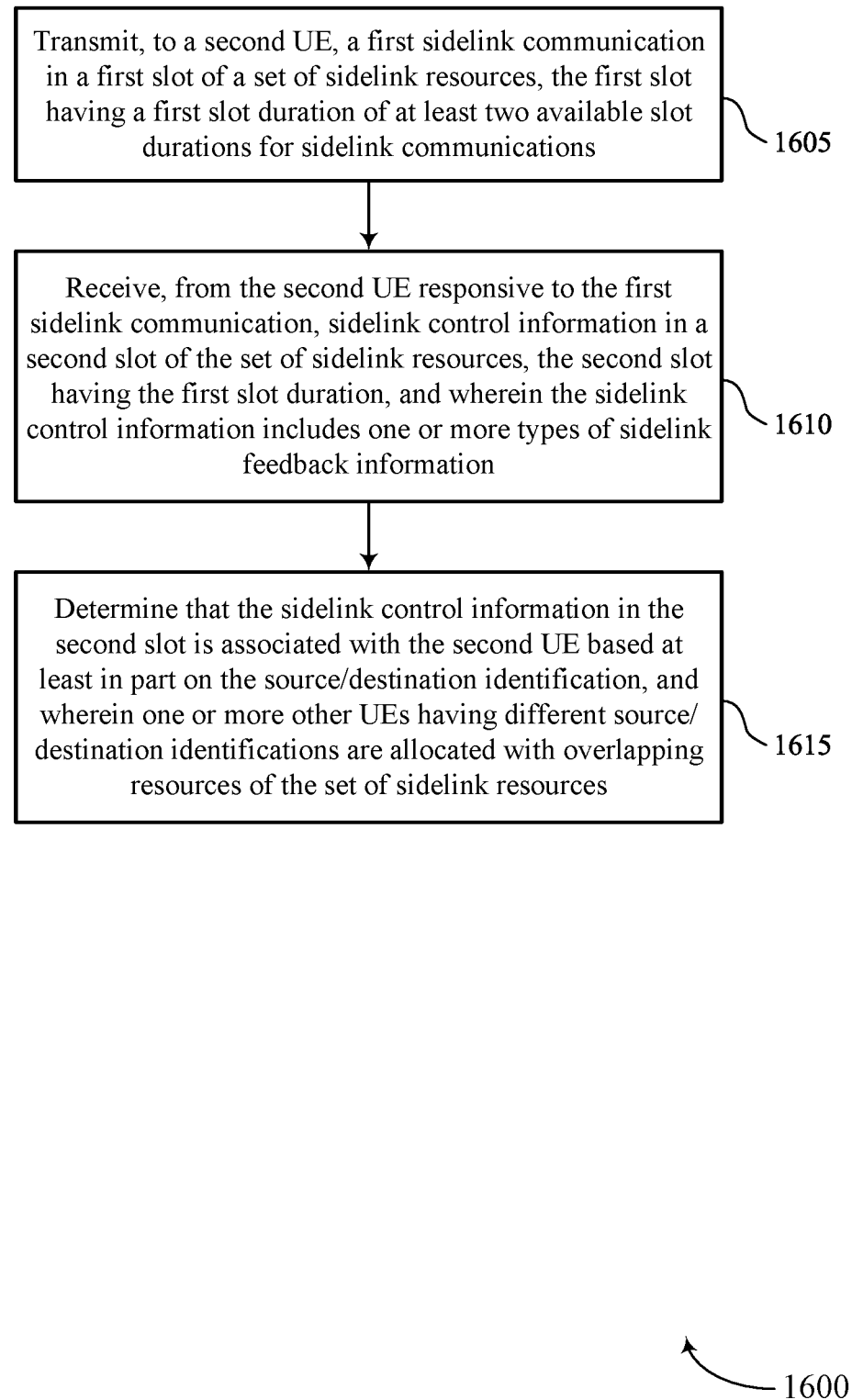

FIG. 16 shows a flowchart illustrating a method 1600 that supports sidelink feedback techniques in sidelink wireless communications in accordance with aspects of the present disclosure. The operations of the method 1600 may be implemented by a UE or its components as described herein. For example, the operations of the method 1600 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1605, the method may include transmitting, to a second UE, a first sidelink communication in a first slot of a set of sidelink resources, the first slot having a first slot duration of at least two available slot durations for sidelink communications. The operations of 1605 may be performed in accordance with examples as disclosed herein. In some examples, aspects of the operations of 1605 may be performed by a sidelink communications manager 1325 as described with reference to FIG. 13.

At 1610, the method may include receiving, from the second UE responsive to the first sidelink communication, sidelink control information in a second slot of the set of sidelink resources, the second slot having the first slot duration, and where the sidelink control information includes one or more types of sidelink feedback information. The operations of 1610 may be performed in accordance with examples as disclosed herein. In some examples, aspects of the operations of 1610 may be performed by a sidelink feedback manager 1330 as described with reference to FIG. 13. In some cases, the sidelink control information is received in a shared channel transmission from the second UE that does not include an associated data transmission, and the sidelink control information includes the one or more types of sidelink feedback information and a source/destination identification that indicates one or more of the first UE or the second UE.

At 1615, the method may include determining that the sidelink control information in the second slot is associated with the second UE based on the source/destination identification, and where one or more other UEs having different source/destination identifications are allocated with overlapping resources of the set of sidelink resources. The operations of 1615 may be performed in accordance with examples as disclosed herein. In some examples, aspects of the operations of 1615 may be performed by a sidelink resource manager 1340 as described with reference to FIG. 13.

Figure 17:
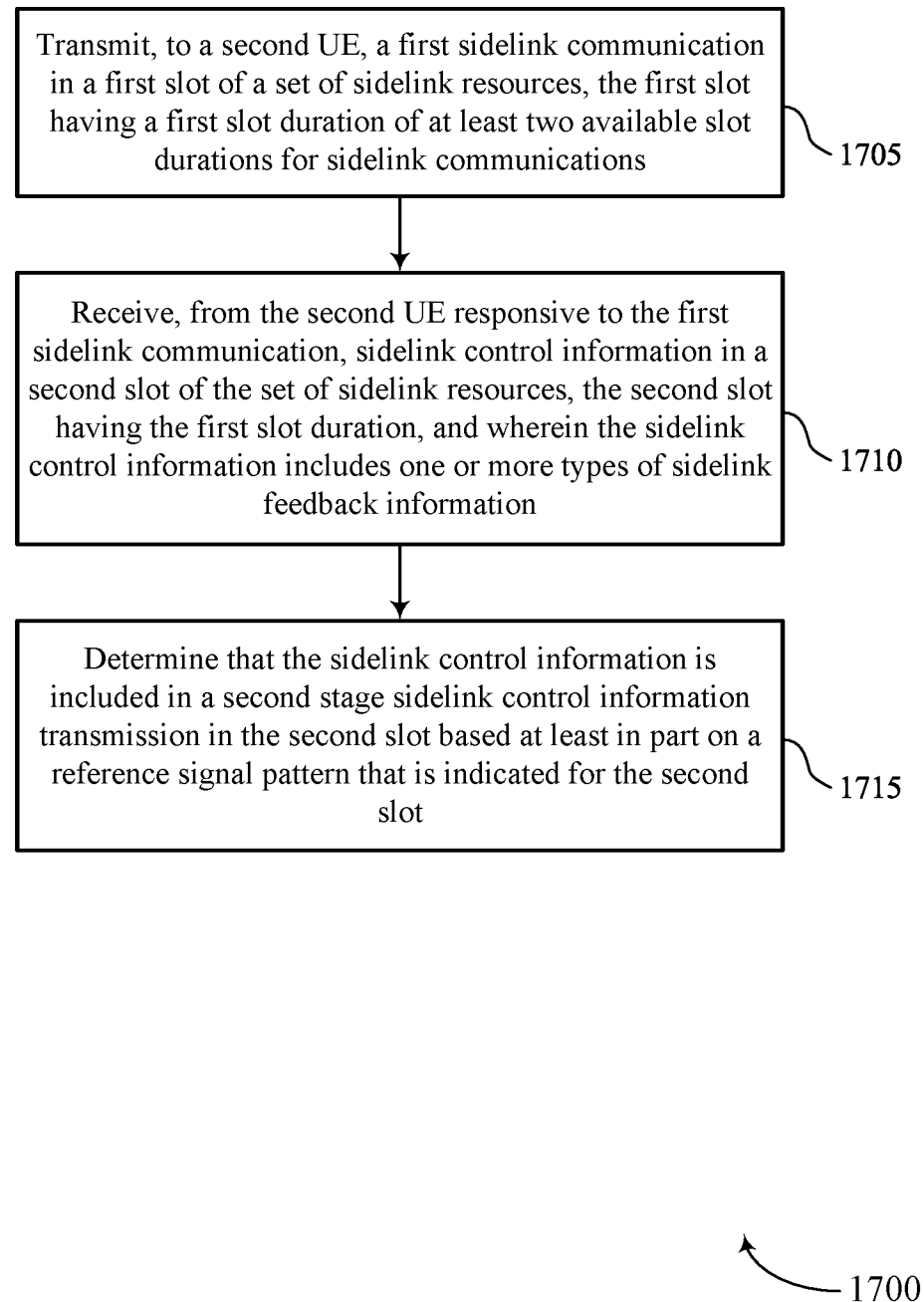

FIG. 17 shows a flowchart illustrating a method 1700 that supports sidelink feedback techniques in sidelink wireless communications in accordance with aspects of the present disclosure. The operations of the method 1700 may be implemented by a UE or its components as described herein. For example, the operations of the method 1700 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1705, the method may include transmitting, to a second UE, a first sidelink communication in a first slot of a set of sidelink resources, the first slot having a first slot duration of at least two available slot durations for sidelink communications. The operations of 1705 may be performed in accordance with examples as disclosed herein. In some examples, aspects of the operations of 1705 may be performed by a sidelink communications manager 1325 as described with reference to FIG. 13.

At 1710, the method may include receiving, from the second UE responsive to the first sidelink communication, sidelink control information in a second slot of the set of sidelink resources, the second slot having the first slot duration, and where the sidelink control information includes one or more types of sidelink feedback information. The operations of 1710 may be performed in accordance with examples as disclosed herein. In some examples, aspects of the operations of 1710 may be performed by a sidelink feedback manager 1330 as described with reference to FIG. 13.

At 1715, the method may include determining that the sidelink control information is included in a second stage sidelink control information transmission in the second slot based on a reference signal pattern that is indicated for the second slot. The operations of 1715 may be performed in accordance with examples as disclosed herein. In some examples, aspects of the operations of 1715 may be performed by a Sidelink control information manager 1335 as described with reference to FIG. 13.

Figure 18:
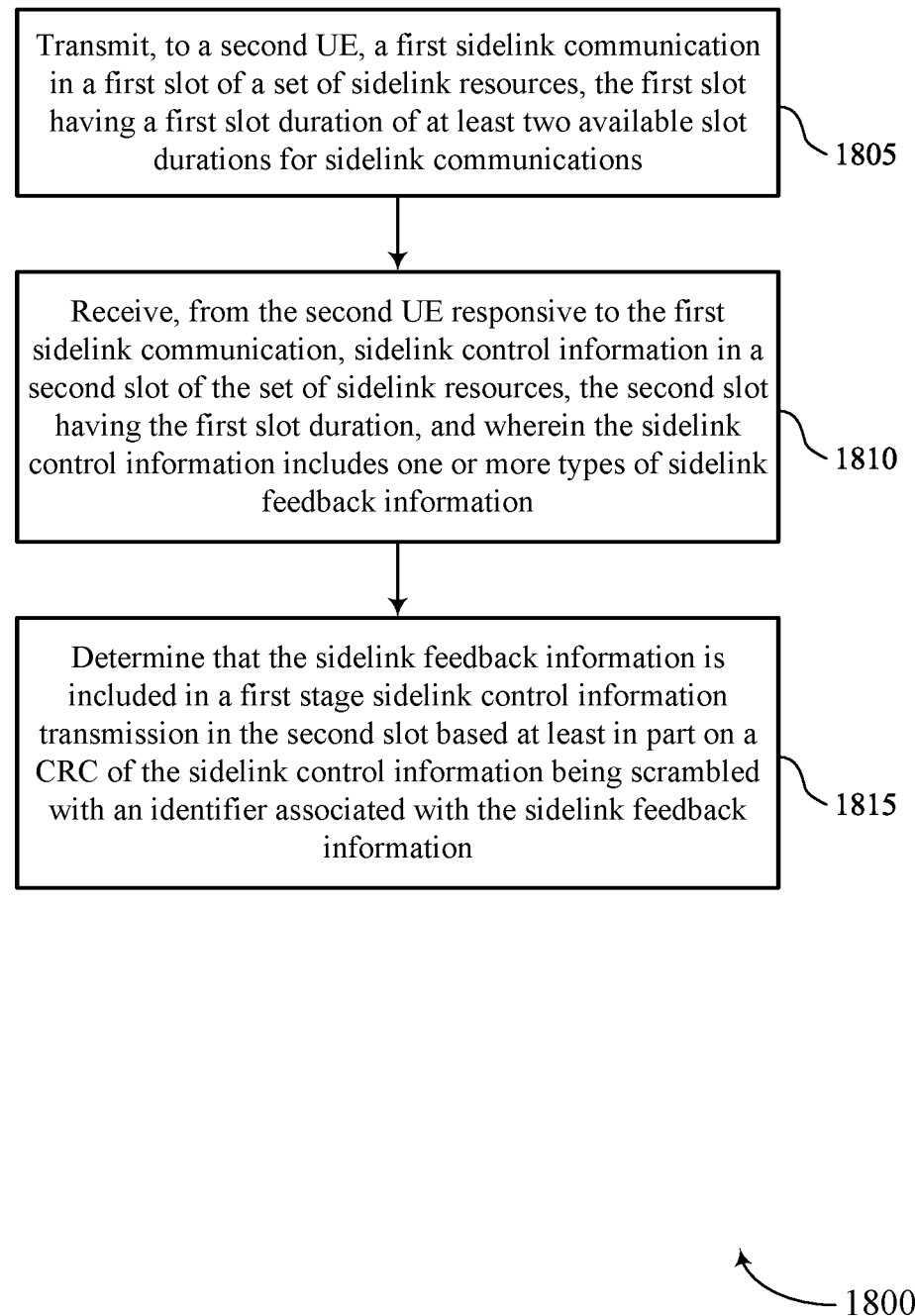

FIG. 18 shows a flowchart illustrating a method 1800 that supports sidelink feedback techniques in sidelink wireless communications in accordance with aspects of the present disclosure. The operations of the method 1800 may be implemented by a UE or its components as described herein. For example, the operations of the method 1800 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1805, the method may include transmitting, to a second UE, a first sidelink communication in a first slot of a set of sidelink resources, the first slot having a first slot duration of at least two available slot durations for sidelink communications. The operations of 1805 may be performed in accordance with examples as disclosed herein. In some examples, aspects of the operations of 1805 may be performed by a sidelink communications manager 1325 as described with reference to FIG. 13.

At 1810, the method may include receiving, from the second UE responsive to the first sidelink communication, sidelink control information in a second slot of the set of sidelink resources, the second slot having the first slot duration, and where the sidelink control information includes one or more types of sidelink feedback information. The operations of 1810 may be performed in accordance with examples as disclosed herein. In some examples, aspects of the operations of 1810 may be performed by a sidelink feedback manager 1330 as described with reference to FIG. 13.

At 1815, the method may include determining that the sidelink feedback information is included in a first stage sidelink control information transmission in the second slot based on a CRC of the sidelink control information being scrambled with an identifier associated with the sidelink feedback information. The operations of 1815 may be performed in accordance with examples as disclosed herein. In some examples, aspects of the operations of 1815 may be performed by a sidelink feedback manager 1330 as described with reference to FIG. 13.

Figure 19:
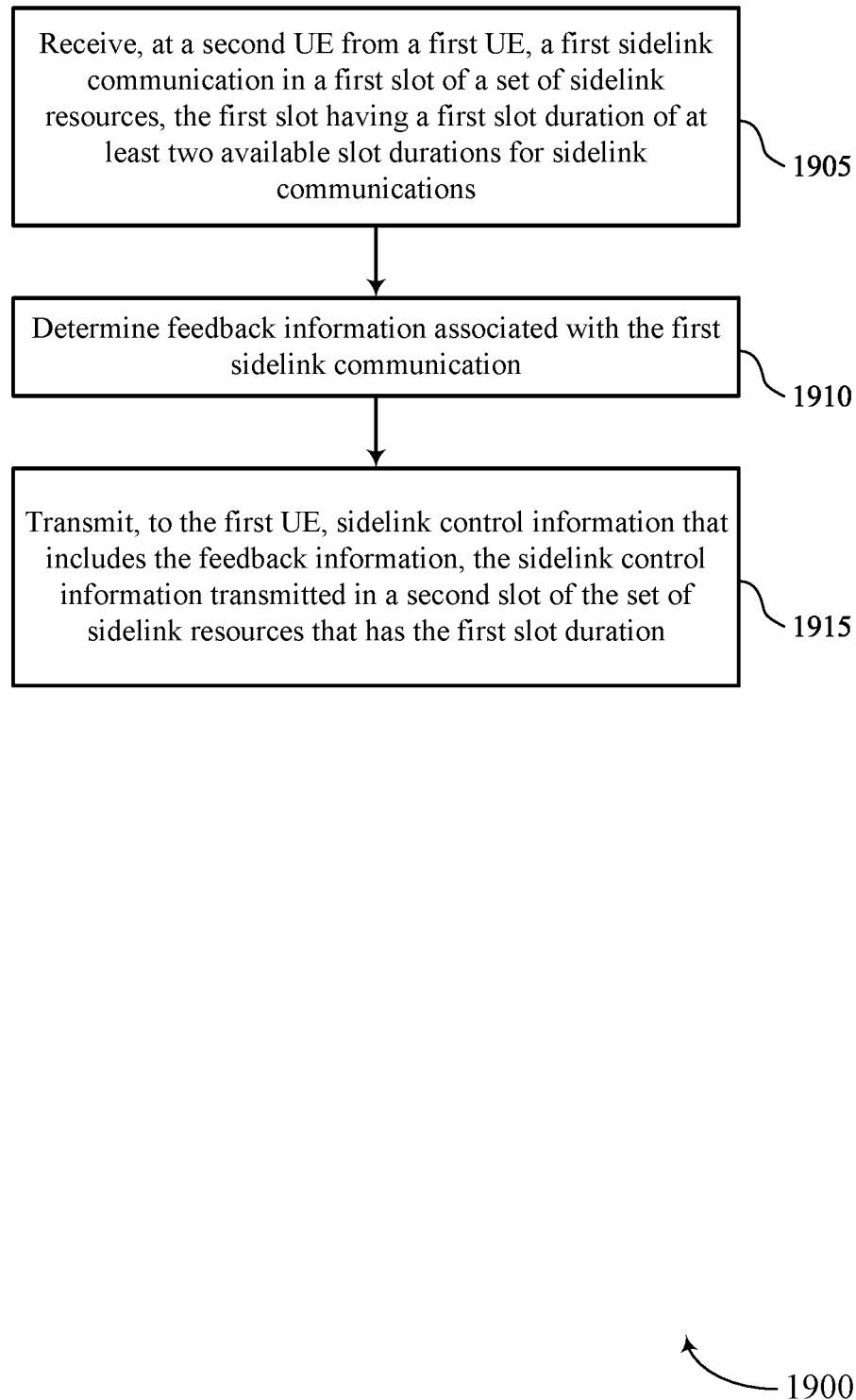

FIG. 19 shows a flowchart illustrating a method 1900 that supports sidelink feedback techniques in sidelink wireless communications in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving, at a second UE from a first UE, a first sidelink communication in a first slot of a set of sidelink resources, the first slot having a first slot duration of at least two available slot durations for sidelink communications. The operations of 1905 may be performed in accordance with examples as disclosed herein. In some examples, aspects of the operations of 1905 may be performed by a sidelink communications manager 1325 as described with reference to FIG. 13.

At 1910, the method may include determining feedback information associated with the first sidelink communication. The operations of 1910 may be performed in accordance with examples as disclosed herein. In some examples, aspects of the operations of 1910 may be performed by a sidelink feedback manager 1330 as described with reference to FIG. 13.

At 1915, the method may include transmitting, to the first UE, sidelink control information that includes the feedback information, the sidelink control information transmitted in a second slot of the set of sidelink resources that has the first slot duration. The operations of 1915 may be performed in accordance with examples as disclosed herein. In some examples, aspects of the operations of 1915 may be performed by a sidelink feedback manager 1330 as described with reference to FIG. 13.

The following provides an overview of aspects of the present disclosure:

Aspect 1: A method for wireless communication at a first UE, comprising: transmitting, to a second UE, a first sidelink communication in a first slot of a set of sidelink resources, the first slot having a first slot duration of at least two available slot durations for sidelink communications; and receiving, from the second UE responsive to the first sidelink communication, sidelink control information in a second slot of the set of sidelink resources, the second slot having the first slot duration, and wherein the sidelink control information includes one or more types of sidelink feedback information.

Aspect 2: The method of aspect 1, wherein the sidelink control information is first stage sidelink control information (SCI-1) or second stage sidelink control information (SCI-2), and the one or more types of sidelink feedback information include acknowledgment/negative-acknowledgment feedback associated with the first sidelink communication, CSI feedback, a scheduling request (SR), or any combinations thereof.

Aspect 3: The method of aspect 1, wherein the sidelink control information is received in a shared channel transmission from the second UE that does not include an associated data transmission, and the sidelink control information includes the one or more types of sidelink feedback information and a source/destination identification that indicates one or more of the first UE or the second UE.

Aspect 4: The method of aspect 3, further comprising: determining that the sidelink control information in the second slot is associated with the second UE based at least in part on the source/destination identification, and wherein one or more other UEs having different source/destination identifications are allocated with overlapping resources of the set of sidelink resources.

Aspect 5: The method of any of aspects 3 through 4, wherein the sidelink control information is rate-matched to all resource elements (REs) of the shared channel transmission.

Aspect 6: The method of aspect 1, wherein the sidelink control information is received in a shared channel transmission from the second UE that also includes an associated data transmission, and the sidelink control information further includes scheduling information that indicates resources for the first UE to transmit feedback information to the second UE associated with the data transmission.

Aspect 7: The method of aspect 6, wherein the scheduling information includes a slot offset value that indicates a number of slots between the shared channel transmission and the sidelink control information transmission, and a resource index that indicates a transmission resource for the sidelink control information transmission.

Aspect 8: The method of aspect 1, further comprising: determining that the sidelink control information is included in a second stage sidelink control information transmission in the second slot based at least in part on a format field in a first stage sidelink control information transmission in the second slot.

Aspect 9: The method of aspect 1, further comprising: determining that the sidelink control information is included in a second stage sidelink control information transmission in the second slot based at least in part on a reference signal pattern that is indicated for the second slot.

Aspect 10: The method of aspect 1, wherein the sidelink control information is received in a sidelink control channel transmission from the second UE that does not include scheduling information for an associated data transmission, and wherein the sidelink control channel transmission is transmitted in one or more resource blocks that span all symbols of the second slot.

Aspect 11: The method of aspect 10, wherein a symbol duration for the sidelink control channel transmission is a same symbol duration or a different symbol duration than a control channel transmissions that include scheduling information for data transmissions.

Aspect 12: The method of any of aspects 10 through 11, wherein the sidelink control channel transmission has a same payload size as a control channel transmission that includes scheduling information for a data transmission.

Aspect 13: The method of aspect 1, further comprising: determining that the sidelink feedback information is included in a first stage sidelink control information transmission in the second slot based at least in part on an CRC of the sidelink control information being scrambled with an identifier associated with the sidelink feedback information.

Aspect 14: The method of aspect 13, wherein the sidelink control information includes the one or more types of sidelink feedback information and an identification of the first UE.

Aspect 15: The method of any of aspects 13 through 14, wherein the identifier used for scrambling the CRC is a unique identifier associated with the first UE.

Aspect 16: The method of any of aspects 1 through 15, wherein the sidelink control information is transmitted within the second slot in resources that are mapped to a first configured subchannel of a plurality of configured subchannels within the set of sidelink resources, and wherein each of the plurality configured subchannels has an associated resource index.

Aspect 17: The method of aspect 16, wherein the first sidelink communication indicates an offset between the first slot and the second slot, and a first index value that indicates the first configured subchannel.

Aspect 18: The method of aspect 17, wherein the offset between the first slot and the second slot is a non-numerical offset that indicates sidelink feedback information for two or more slots are to be transmitted to the first UE in a same sidelink control information transmission.

Aspect 19: The method of any of aspects 1 through 18, wherein the one or more types of sidelink feedback information includes CSI feedback, and wherein the first sidelink communication indicates resources for transmission of the CSI feedback and includes a trigger to initiate CSI measurement at the second UE.

Aspect 20: The method of any of aspects 1 through 19, wherein the set of sidelink resources include a plurality of sidelink resources that are allocated according to a second slot duration of the at least two available slot durations for sidelink communications, wherein the first slot duration is shorter than the second slot duration.

Aspect 21: The method of aspect 20, wherein a subset of the set of sidelink resources is configured for sidelink control information transmissions according to the first slot duration.

Aspect 22: The method of any of aspects 20 through 21, wherein the first sidelink communication schedules one or more sidelink communications according to the second slot duration, and indicates an offset between the first slot and the second slot and a first index value that indicates resources for the sidelink control information based on the first slot duration.

Aspect 23: The method of any of aspects 20 through 22, wherein the one or more types of sidelink feedback information includes CSI feedback, and wherein the first sidelink communication indicates resources for transmission of the CSI feedback based on the first slot duration and includes a trigger to initiate CSI measurement at the second UE.

Aspect 24: A method for wireless communications, comprising: receiving, at a second UE from a first UE, a first sidelink communication in a first slot of a set of sidelink resources, the first slot having a first slot duration of at least two available slot durations for sidelink communications; determining feedback information associated with the first sidelink communication; and transmitting, to the first UE, sidelink control information that includes the feedback information, the sidelink control information transmitted in a second slot of the set of sidelink resources that has the first slot duration.

Aspect 25: The method of aspect 24, wherein the sidelink control information is first stage sidelink control information (SCI-1) or second stage sidelink control information (SCI-2), and the sidelink feedback information includes one or more of acknowledgment/negative-acknowledgment feedback associated with the first sidelink communication, CSI feedback, a scheduling request (SR), or any combinations thereof.

Aspect 26: The method of aspect 24, wherein the sidelink control information is transmitted in a shared channel transmission from the second UE that does not include an associated data transmission, and the sidelink control information includes the sidelink feedback information and a source/destination identification that indicates one or more of the first UE or the second UE.

Aspect 27: The method of aspect 24, wherein the sidelink control information is transmitted in a shared channel transmission that also includes an associated data transmission, and the sidelink control information further includes scheduling information that indicates resources for the first UE to transmit feedback information to the second UE associated with the data transmission.

Aspect 28: An apparatus for wireless communication at a first UE, comprising a processor; memory coupled with the processor; and instructions stored in the memory and executable by the processor to cause the apparatus to perform a method of any of aspects 1 through 23.

Aspect 29: An apparatus for wireless communication at a first UE, comprising at least one means for performing a method of any of aspects 1 through 23.

Aspect 30: A non-transitory computer-readable medium storing code for wireless communication at a first UE, the code comprising instructions executable by a processor to perform a method of any of aspects 1 through 23.

Aspect 31: An apparatus for wireless communications, comprising a processor; memory coupled with the processor; and instructions stored in the memory and executable by the processor to cause the apparatus to perform a method of any of aspects 24 through 27.

Aspect 32: An apparatus for wireless communications, comprising at least one means for performing a method of any of aspects 24 through 27.

Aspect 33: A non-transitory computer-readable medium storing code for wireless communications, the code comprising instructions executable by a processor to perform a method of any of aspects 24 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
    one or more memories storing processor-executable code; and
    one or more processors coupled with the one or more memories and individually or collectively operable to execute the code to cause the UE to:
        transmit, to a second UE, a first sidelink communication in a first slot of a set of sidelink resources, the first slot having a first slot duration of at least two available slot durations for sidelink communications; and
        receive, from the second UE responsive to the first sidelink communication, sidelink control information in a second slot of the set of sidelink resources, the second slot having the first slot duration, and wherein the sidelink control information includes one or more types of sidelink feedback information.

2. The UE of claim 1, wherein the sidelink control information is first stage sidelink control information (SCI-1) or second stage sidelink control information (SCI-2), and the one or more types of sidelink feedback information include acknowledgment/negative-acknowledgment feedback associated with the first sidelink communication, channel state information (CSI) feedback, a scheduling request (SR), or any combinations thereof.

3. The UE of claim 1, wherein the sidelink control information is received in a shared channel transmission from the second UE that does not include an associated data transmission, and the sidelink control information includes the one or more types of sidelink feedback information and a source/destination identification that indicates one or more of the first UE or the second UE.

4. The UE of claim 3, wherein the one or more processors are individually or collectively further operable to execute the code to cause the UE to:
    determine that the sidelink control information in the second slot is associated with the second UE based at least in part on the source/destination identification, and wherein one or more other UEs having different source/destination identifications are allocated with overlapping resources of the set of sidelink resources.

5. The UE of claim 3, wherein the sidelink control information is rate-matched to all resource elements (REs) of the shared channel transmission.

6. The UE of claim 1, wherein the sidelink control information is received in a shared channel transmission from the second UE that also includes an associated data transmission, and the sidelink control information further includes scheduling information that indicates resources for the first UE to transmit feedback information to the second UE associated with the data transmission.

7. The UE of claim 6, wherein the scheduling information includes a slot offset value that indicates a number of slots between the shared channel transmission and the sidelink control information transmission, and a resource index that indicates a transmission resource for the sidelink control information transmission.

8. The UE of claim 1, wherein the instructions are further executable by the processor to cause the apparatus to:
   determine that the sidelink control information is included in a second stage sidelink control information transmission in the second slot based at least in part on a format field in a first stage sidelink control information transmission in the second slot.

9. The apparatus of claim 1, wherein the one or more processors are individually or collectively further operable to execute the code to cause the UE to:
   determine that the sidelink control information is included in a second stage sidelink control information transmission in the second slot based at least in part on a reference signal pattern that is indicated for the second slot.

10. The UE of claim 1, wherein the sidelink control information is received in a sidelink control channel transmission from the second UE that does not include scheduling information for an associated data transmission, and wherein the sidelink control channel transmission is transmitted in one or more resource blocks that span all symbols of the second slot.

11. The UE of claim 10, wherein a symbol duration for the sidelink control channel transmission is a same symbol duration or a different symbol duration than a control channel transmissions that include scheduling information for data transmissions.

12. The UE of claim 10, wherein the sidelink control channel transmission has a same payload size as a control channel transmission that includes scheduling information for a data transmission.

13. The UE of claim 1, wherein the one or more processors are individually or collectively further operable to execute the code to cause the UE to:
   determine that the sidelink feedback information is included in a first stage sidelink control information transmission in the second slot based at least in part on a cyclic redundancy check (CRC) of the sidelink control information being scrambled with an identifier associated with the sidelink feedback information.

14. The UE of claim 13, wherein the sidelink control information includes the one or more types of sidelink feedback information and an identification of the first UE.

15. The UE of claim 13, wherein the identifier used for scrambling the CRC is a unique identifier associated with the first UE.

16. The UE of claim 1, wherein the sidelink control information is transmitted within the second slot in resources that are mapped to a first configured subchannel of a plurality of configured subchannels within the set of sidelink resources, and wherein each of the plurality configured subchannels has an associated resource index.

17. The UE of claim 16, wherein the first sidelink communication indicates an offset between the first slot and the second slot, and a first index value that indicates the first configured subchannel.

18. The UE of claim 17, wherein the offset between the first slot and the second slot is a non-numerical offset that indicates sidelink feedback information for two or more slots are to be transmitted to the first UE in a same sidelink control information transmission.

19. The UE of claim 1, wherein the one or more types of sidelink feedback information includes channel state information (CSI) feedback, and wherein the first sidelink communication indicates resources for transmission of the CSI feedback and includes a trigger to initiate CSI measurement at the second UE.

20. The UE of claim 1, wherein the set of sidelink resources include a plurality of sidelink resources that are allocated according to a second slot duration of the at least two available slot durations for sidelink communications, wherein the first slot duration is shorter than the second slot duration.

21. The UE of claim 20, wherein a subset of the set of sidelink resources is configured for sidelink control information transmissions according to the first slot duration.

22. The UE of claim 20, wherein the first sidelink communication schedules one or more sidelink communications according to the second slot duration, and indicates an offset between the first slot and the second slot and a first index value that indicates resources for the sidelink control information based on the first slot duration.

23. The UE of claim 20, wherein the one or more types of sidelink feedback information includes channel state information (CSI) feedback, and wherein the first sidelink communication indicates resources for transmission of the CSI feedback based on the first slot duration and includes a trigger to initiate CSI measurement at the second UE.

24. A second user equipment (UE) for wireless communication, comprising:
   one or more memories storing processor-executable code; and
   one or more processors coupled with the one or more memories and individually or collectively operable to execute the code to cause the second UE to:
      receive, at the second UE from a first UE, a first sidelink communication in a first slot of a set of sidelink resources, the first slot having a first slot duration of at least two available slot durations for sidelink communications;
      determine feedback information associated with the first sidelink communication; and
      transmit, to the first UE, sidelink control information that includes the feedback information, the sidelink control information transmitted in a second slot of the set of sidelink resources that has the first slot duration.

25. The second UE of claim 24, wherein the sidelink control information is first stage sidelink control information (SCI-1) or second stage sidelink control information (SCI-2), and the sidelink feedback information includes one or more of acknowledgment/negative-acknowledgment feedback associated with the first sidelink communication, channel state information (CSI) feedback, a scheduling request (SR), or any combinations thereof.

26. The second UE of claim 24, wherein the sidelink control information is transmitted in a shared channel transmission from the second UE that does not include an associated data transmission, and the sidelink control information includes the sidelink feedback information and a source/destination identification that indicates one or more of the first UE or the second UE.

27. The second UE of claim 24, wherein the sidelink control information is transmitted in a shared channel transmission that also includes an associated data transmission, and the sidelink control information further includes scheduling information that indicates resources for the first UE to transmit feedback information to the second UE associated with the data transmission.

28. A method for wireless communication at a first user equipment (UE), comprising:
   transmitting, to a second UE, a first sidelink communication in a first slot of a set of sidelink resources, the first slot having a first slot duration of at least two available slot durations for sidelink communications; and
   receiving, from the second UE responsive to the first sidelink communication, sidelink control information in a second slot of the set of sidelink resources, the second slot having the first slot duration, and wherein the sidelink control information includes one or more types of sidelink feedback information.

29. The method of claim 28, wherein the sidelink control information is first stage sidelink control information (SCI-1) or second stage sidelink control information (SCI-2), and the one or more types of sidelink feedback information include acknowledgment/negative-acknowledgment feedback associated with the first sidelink communication, channel state information (CSI) feedback, a scheduling request (SR), or any combinations thereof.

30. A method for wireless communication, comprising:
   receiving, at a second user equipment (UE) from a first UE, a first sidelink communication in a first slot of a set of sidelink resources, the first slot having a first slot duration of at least two available slot durations for sidelink communications;
   determining feedback information associated with the first sidelink communication; and
   transmitting, to the first UE, sidelink control information that includes the feedback information, the sidelink control information transmitted in a second slot of the set of sidelink resources that has the first slot duration.

* * * * *